United States Patent
Russell

(10) Patent No.: US 11,428,942 B2
(45) Date of Patent: Aug. 30, 2022

(54) SYSTEMS AND METHODS FOR EXTERNAL LIGHT MANAGEMENT

(71) Applicant: MAGIC LEAP, INC., Plantation, FL (US)

(72) Inventor: Andrew Ian Russell, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/275,663

(22) PCT Filed: Sep. 13, 2019

(86) PCT No.: PCT/US2019/051188
§ 371 (c)(1),
(2) Date: Mar. 11, 2021

(87) PCT Pub. No.: WO2020/056384
PCT Pub. Date: Mar. 19, 2020

(65) Prior Publication Data
US 2022/0050295 A1      Feb. 17, 2022

Related U.S. Application Data

(60) Provisional application No. 62/731,755, filed on Sep. 14, 2018.

(51) Int. Cl.
*G02F 1/1335*     (2006.01)
*G02B 27/01*      (2006.01)
(Continued)

(52) U.S. Cl.
CPC ....... *G02B 27/0172* (2013.01); *G02F 1/0136* (2013.01); *G02F 1/133528* (2013.01);
(Continued)

(58) Field of Classification Search
CPC .................................................. G02F 1/133528
See application file for complete search history.

(56) References Cited

U.S. PATENT DOCUMENTS 9,791,700 B2    10/2017  Schowengerdt
10,359,627 B2    7/2019  Wall et al.
(Continued)

FOREIGN PATENT DOCUMENTS

| EP | 2930552 | 10/2015 |
|----|---------|---------|
| EP | 3226063 | 10/2017 |
| WO | WO 2016133886 | 8/2016 |

OTHER PUBLICATIONS

PCT International Search Report and Written Opinion for International Appln. No. PCT/US2019/051188, Applicant Magic Leap, Inc., forms PCT/ISA/210, 220, and 237, dated Dec. 3, 2019 (7 pages).

(Continued)

*Primary Examiner* — Edmond C Lau
(74) *Attorney, Agent, or Firm* — Vista IP Law Group, LLP

(57) ABSTRACT

An augmented reality system includes a light source to generate a virtual light beam, the virtual light beam carrying information for a virtual object. The system also includes a light guiding optical element, the light guiding optical element allowing a first portion of a first real-world light beam to pass therethrough, where the virtual light beam enters the light guiding optical element, propagates through the light guiding optical element by substantially total internal reflection (TIR), and exits the light guiding optical element. The system further includes a lens disposed adjacent and exterior to a surface of the light guiding optical element, the lens comprising a light modulating mechanism to absorb a second portion of the real-world light beam and to allow the first portion of the real-world light to pass through the lens.

19 Claims, 21 Drawing Sheets

(51) Int. Cl.
*G02F 1/01* (2006.01)
*G02F 1/1343* (2006.01)

(52) U.S. Cl.
CPC ............... *G02F 1/134309* (2013.01); *G02B 2027/0118* (2013.01); *G02B 2027/0134* (2013.01)

(56) References Cited

U.S. PATENT DOCUMENTS

| | | |
|---|---|---|
| 10,437,326 B2 | 10/2019 | Richards et al. |
| 2005/0280894 A1 | 12/2005 | Hartkop et al. |
| 2015/0205126 A1 | 7/2015 | Schowengerdt |
| 2015/0235471 A1* | 8/2015 | Schowengerdt ... G02B 27/0093 345/633 |
| 2017/0293141 A1 | 10/2017 | Schowengerdt |

OTHER PUBLICATIONS

Extended European Search Report for EP Patent Appln. No. 19859218.0 dated Oct. 8, 2021.

International Preliminary Report on Patentability for International Appln. No. PCT/US2019/051188 dated Mar. 9, 2021.

* cited by examiner

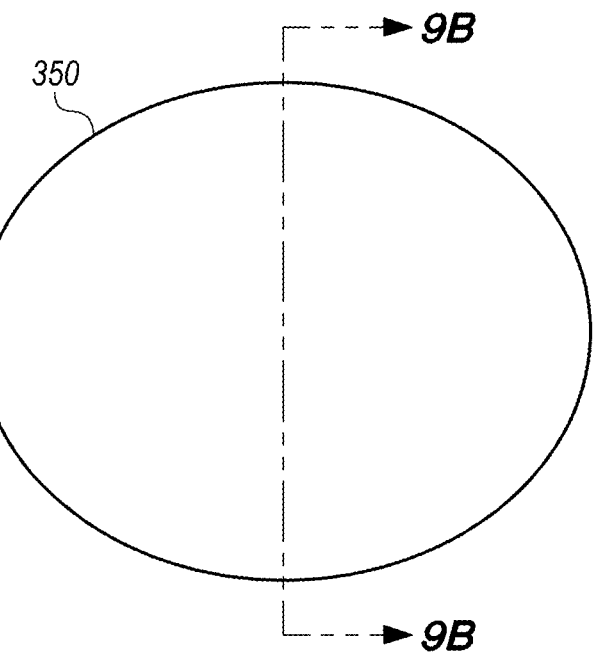
FIG. 9A
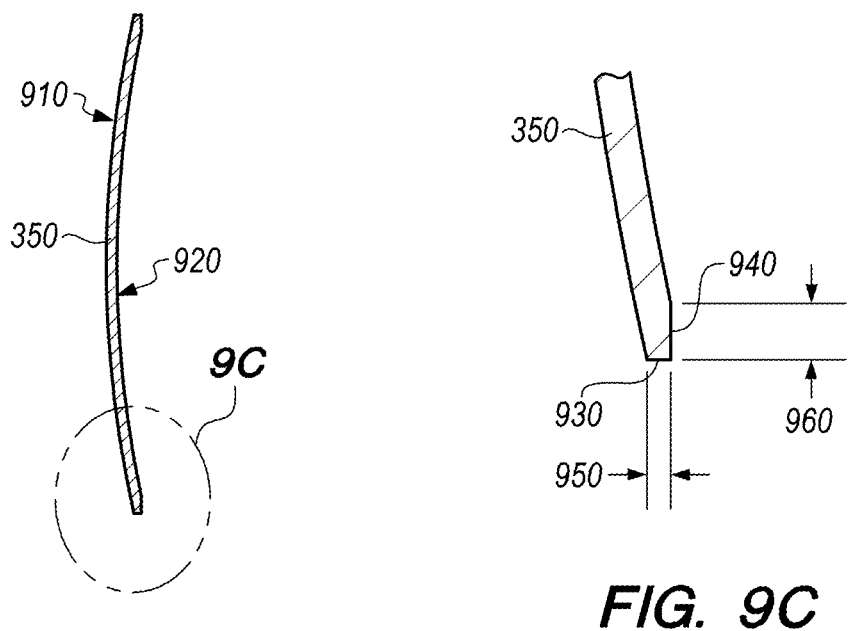
FIG. 9B
FIG. 9C

SYSTEMS AND METHODS FOR EXTERNAL LIGHT MANAGEMENT

CROSS-REFERENCE TO RELATED APPLICATION(S)

This application claims priority to U.S. Provisional Patent Application Ser. No. 62/731,755 filed on Sep. 14, 2018, entitled "SYSTEMS AND METHODS FOR EXTERNAL LIGHT MANAGEMENT," the content of which is hereby expressly and fully incorporated by reference in its entirety, as though set forth in full. This application is related to U.S. Utility patent application Ser. No. 15/479,700, filed on Apr. 5, 2017 and entitled "SYSTEM AND METHOD FOR AUGMENTED REALITY," U.S. Utility patent application Ser. No. 14/331,218 filed on Jul. 14, 2014 and entitled "PLANAR WAVEGUIDE APPARATUS WITH DIFFRACTION ELEMENT(S) AND SYSTEM EMPLOYING SAME," U.S. Utility patent application Ser. No. 14/555,585 filed on Nov. 27, 2014 and entitled "VIRTUAL AND AUGMENTED REALITY SYSTEMS AND METHODS," U.S. Utility patent application Ser. No. 14/726,424 filed on May 29, 2015 and entitled "METHODS AND SYSTEMS FOR VIRTUAL AND AUGMENTED REALITY," U.S. Utility patent application Ser. No. 14/726,429 filed on May 29, 2015 and entitled "METHODS AND SYSTEMS FOR CREATING FOCAL PLANES IN VIRTUAL AND AUGMENTED REALITY," U.S. Utility patent application Ser. No. 14/726,396 filed on May 29, 2015 and entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY," U.S. Provisional Patent Application Ser. No. 62/702,212 filed on Jul. 23, 2018 and entitled "SYSTEMS AND METHODS FOR EXTERNAL LIGHT MANAGEMENT," and U.S. Utility patent application Ser. No. 16/557,706 filed on Aug. 30, 2019 and entitled "SPATIALLY-RESOLVED DYNAMIC DIMMING FOR AUGMENTED REALITY DEVICE." The contents of the aforementioned patent applications are hereby expressly and fully incorporated by reference in their entirety, as though set forth in full.

BACKGROUND

Modern computing and display technologies have facilitated the development of systems for so called "augmented reality" experiences, wherein digitally reproduced images or portions thereof are presented to a user in a manner wherein they seem to be, or may be perceived as, real. An augmented reality, or "AR", scenario typically involves presentation of digital or virtual image information as an augmentation to visualization of the actual world around the user (i.e., transparency to other actual real-world visual input). Accordingly, AR scenarios involve presentation of digital or virtual image information with transparency to other actual real-world visual input. The human visual perception system is very complex, and producing an AR technology that facilitates a comfortable, natural-feeling, rich presentation of virtual image elements amongst other virtual or real-world imagery elements is challenging.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic AR configurations, is known to produce eye fatigue, headaches, or other forms of discomfort in users.

Stereoscopic wearable glasses generally feature two displays for the left and right eyes that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some AR users are not able to tolerate stereoscopic configurations. Accordingly, most conventional AR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

AR systems must also be capable of displaying virtual digital content at various perceived positions and distances relative to the user. The design of AR systems also presents numerous other challenges, including the speed of the system in delivering virtual digital content, quality of virtual digital content, eye relief of the user (addressing the vergence-accommodation conflict), size and portability of the system, and other system and optical challenges.

One possible approach to address these problems (including the vergence-accommodation conflict) is to project images at multiple depth planes. To implement this type of system, one approach is to use a plurality of light-guiding optical elements to direct light at the eyes of a user such that the light appears to originate from multiple depth planes. The light-guiding optical elements are designed to in-couple virtual light corresponding to digital or virtual objects and propagate it by total internal reflection ("TIR"), then to out-couple the virtual light to display the digital or virtual objects to the user's eyes. The light-guiding optical elements are also designed to be transparent to light from (e.g., reflecting off of) actual real-world objects.

However, some real-world light can be in-coupled into the light-guiding optical element and out-couple in an uncontrolled manner, resulting in an unintended rainbow artifact being presented to the user's eyes as a result of the real-world light being diffracted by the light-guiding optical element. The appearance of unintended rainbow artifacts in an AR scenario can disrupt the intended effect of the AR scenario. The systems and methods described herein are configured to address these challenges.

SUMMARY

In one embodiment, an augmented reality system includes a light source configured to generate a virtual light beam, the virtual light beam carries information for a virtual object. The system also includes a light guiding optical element, the light guiding optical element is transparent to a first real-world light beam, wherein the virtual light beam enters the light guiding optical element, propagates through the light guiding optical element by total internal reflection (TIR) and exits the light guiding optical elements. Additionally, the system also includes a lens disposed adjacent and exterior to a surface of the light guiding optical element, wherein the lens is configured with a tint that absorbs an amount of real-world light to allow a portion of the real-world light to transmit through the light guiding optical element.

In one or more embodiments, the tint is a gradient tint that transmits less real-world light at a world side top portion of the lens and transmits more real-world light at a world side bottom portion of the lens, wherein rainbow artifacts, generated from inadvertent diffraction of an overhead real-world light by the light guiding optical element, is minimized.

In one or more embodiments, the gradient tint gradually transmits more real-world light starting from the world side top portion of the lens to the world side bottom portion of the lens. A first transmission average ($T_{avg}$) at a top edge of the lens is 5%, a second $T_{avg}$ at a middle portion of the lens is 28%, and a third $T_{avg}$ at a bottom portion of the lens is a consistent 33% across the bottom portion, wherein an amount of real world light transmitted through the lens having the gradient tint is expressed as a $T_{avg}$. The lens provides a protective element to the light guiding optical element.

In one or more embodiments, the lens further comprises a diverter disposed adjacent thereto, wherein the diverter is configured to modify a light path of a second real-world light beam at a surface of the lens, the second real-world light beam originating from an overhead position relative to a world side top.

In one or more embodiments, the lens is configured with the diverter and a gradient tint, wherein a combination of the diverter and the gradient tint minimizes a rainbow effect generated from an inadvertent diffraction of the second real-world light beam by the light guiding optical elements.

In one or more embodiments, the diverter is configured to reflect the second real-world light beam.

In one or more embodiments, the diverter is configured to refract or diffract the second real-world light beam.

In one or more embodiments, the lens further comprises orientation markings, wherein the orientation markings are used during assembly to mount the lens onto an eyeglass frame. The orientation markings comprise a special ink making the orientation markings visible under special lighting during assembly and not visible to a user during regular use.

In one or more embodiments, the special ink is an infrared ink.

In one or more embodiments, the special ink is an ultraviolet ink.

In one or more embodiments, the special ink is not removed after initial assembly of the lens onto the eyeglass frame, wherein the lens is re-used and re-assembled after maintenance work is completed on the lens or eyeglass frame.

In another embodiment, an augmented reality system includes a lens having a flat periphery surface substantially orthogonal to a frame. The system also includes the frame having a flat surface for mounting the flat periphery surface to the flat surface of the frame, the lens providing a protective element to optical elements of the augmented reality system.

In one or more embodiments, the lens is constructed with Trivex. A center thickness of the lens is 1.2 mm +/−0.2 mm. The lens has a radius of curvature of 86.8 mm +/−0.9 mm. The lens comprises at least one of a gradient tint coating, a hard coating, a mirror coating, an anti-smudge coating, and/or an anti-reflection.

In still another embodiment, an augmented reality system includes a light source to generate a virtual light beam, the virtual light beam carrying information for a virtual object. The system also includes a light guiding optical element, the light guiding optical element allowing a first portion of a first real-world light beam to pass therethrough, where the virtual light beam enters the light guiding optical element, propagates through the light guiding optical element by substantially total internal reflection (TIR), and exits the light guiding optical element. The system further includes a lens disposed adjacent and exterior to a surface of the light guiding optical element, the lens comprising a light modulating mechanism to attenuate a second portion of the real-world light beam and to allow the first portion of the real-world light to pass through the lens.

In one or more embodiments, the light modulating mechanism includes a liquid crystal layer, first and second electrodes disposed adjacent to and on opposite sides of the liquid crystal layer, first and second compensation films disposed adjacent and exterior to the first and second electrodes, respectively, and first and second polarizers disposed adjacent and exterior to the first and second compensation films, respectively. The first and second polarizer may each include a plurality of regions configured to impart different degrees of polarization on light passing therethrough. The liquid crystal layer may be configured to impart a degree of retardation or polarization rotation on light passing therethrough in response to a voltage applied by the first and second electrodes. The degree of polarization imparted by the liquid crystal layer may be proportional to the voltage applied by the first and second electrodes.

In one or more embodiments, the first and second electrodes are configured to apply a voltage to the liquid crystal layer that varies along a direction in the liquid crystal layer. The direction may be from a bottom of the liquid crystal layer to a top of the liquid crystal layer. The first and second electrodes may be separated by a distance that increases along the direction in the liquid crystal layer. The first electrode may taper away from the second electrode such that the distance increases along the direction in the liquid crystal layer. The first electrode may include a plurality of segments, each adjacent pair of segments having a preceding segment disposed farther from the second electrode compared to a following segment in the direction. The first electrode may have a thickness that decreases along the direction.

In one or more embodiments, the first electrode includes first, second, and third segments disposed along the direction, and the first and third segments have a first and a third resistance that is lower than a second resistance of the second segment. The first and third segments may include indium tin oxide. The second segment may include graphene. The system may also include first and second voltage sources electrically coupled to the first and third segments of the first electrode.

In one or more embodiments, the first electrode includes a plurality of segments disposed along the direction and electrically separated from each other by a corresponding plurality of resistors. The system may also include a voltage source electrically coupled to a first segment of the plurality of segments at a far end of the first electrode along the direction. The first electrode may have a flatten shape, and the plurality of resistors may be disposed along an edge of the first electrode. The plurality of segments may be physically separated from each other by a plurality of electrically-insulating members. Each of the plurality of resistors may be disposed physically between respective pairs of the plurality of segments.

In one or more embodiments, a head-mounted device comprises: a frame configured to be worn about a head of a user of the head-mounted device; a controllable dimming assembly physically coupled to the frame in a manner so as to be positioned between an eye of the user and an environment of the user when the head-mounted device is worn by the user, wherein the controllable dimming assembly is configured to exhibit levels of opacity that vary from a first level of opacity to a second level of opacity as a function of location on the controllable dimming assembly; and control circuitry electrically coupled to the controllable dimming assembly, wherein the control circuitry is configured to apply one or more electrical signals to the controllable dimming assembly to adjust one or both of the first and second levels of opacity.

In some implementations, the controllable dimming assembly is configured to exhibit (i) the first level of opacity at a first location on the controllable dimming assembly, and (ii) levels of opacity that vary as a function of distance from first location on the controllable dimming assembly. In some of these implementations, the controllable dimming assembly is configured to exhibit the second level of opacity at a second location on the controllable dimming assembly, the second location being different from the first location. In some such implementations, the first location or the second location corresponds to a set of one or more points along at least a portion of an outer perimeter of the controllable dimming assembly. Furthermore, in some such implementations, the first location corresponds to a location within an inner region of the controllable dimming assembly. In some examples, the location within the inner region of the controllable dimming assembly corresponds to a center of the controllable dimming assembly.

In some embodiments, the first level of opacity represents a global minimum level of opacity and the second level of opacity represents a global maximum level of opacity.

In some implementations, the controllable dimming assembly is configured to exhibit levels of opacity that vary linearly, exponentially, or logarithmically as a function of location on the controllable dimming assembly.

In some embodiments, the controllable dimming assembly is configured such that the first level of opacity and the second level of opacity vary based on a level of voltage of one or more electrical signals applied as input to the controllable dimming assembly.

In some implementations, the controllable dimming assembly is configured such that the first level of opacity and the second level of opacity change at different rates as the level of voltage changes.

In some embodiments, the controllable dimming assembly comprises: first and second polarizers; first and second electrode assemblies disposed between the first and second polarizers; and a liquid crystal layer disposed between the first and second electrode assemblies. In some of these embodiments, the control circuitry is electrically coupled to the first and second electrode assemblies and configured to apply one or more electrical signals to the controllable dimming assembly to produce an electric field between the first and second electrode assemblies.

Furthermore, in some such embodiments, one or both of the first and second polarizers are configured to impart spatially-varying degrees of polarization to light passing therethrough.

In at least some of these embodiments, to produce the electric field between the first and second electrode assemblies, the controllable dimming assembly is configured to produce an electric field exhibiting spatially-varying levels of electric field strength between the first and second electrode assemblies.

In some such embodiments, wherein one or both of the first and second electrode assemblies are configured such that one or more properties thereof are spatially-varying. In some examples, the one or more properties comprise a thickness, resistance, conductance, orientation, composition, or a combination thereof.

In some implementations, the control circuitry comprises a one or more of a voltage divider network, conductors, a processor, and a power supply.

In some embodiments, the controllable dimming assembly is physically coupled to the frame in a manner so as to be positioned between both eyes of the user and an environment of the user when the head-mounted device is worn by the user.

In some implementations, the control circuitry is further configured to receive input from one or more data sources, and wherein to apply one or more electrical signals to the controllable dimming assembly to adjust one or both of the first and second levels of opacity, the control circuitry is configured to apply one or more electrical signals to the controllable dimming assembly to adjust one or both of the first and second levels of opacity based on input received from the one or more data sources. In some such implementations, the one or more data sources comprise one or more sensing devices, user interface components, display system components, network-accessible resources, or a combination thereof.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 9 illustrates multiple views of flat periphery surfaces around an edge of the gradient tinted lens of an augmented reality system, according to some embodiments of the present disclosure;

DETAILED DESCRIPTION

Figure 1:
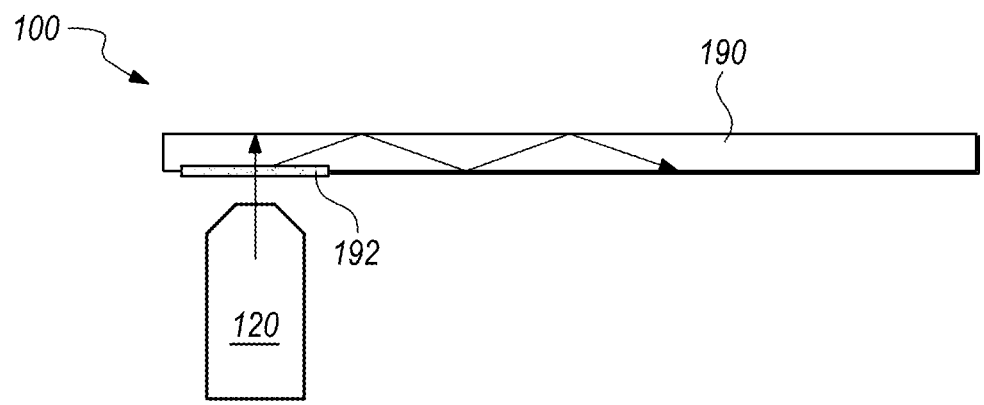
FIGS. 1 to 3 are detailed schematic views of various augmented reality systems.

Various embodiments of the invention are directed to systems, methods, and articles of manufacture for implementing optical systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The optical systems may be implemented independently of AR systems, but many embodiments below are described in relation to AR systems for illustrative purposes only.

Summary of Problem and Solution

One type of optical system for generating virtual images at various depths while allowing real-world light to pass through includes at least partially transparent light-guiding optical elements (e.g., prisms including diffractive optical elements). However, these light-guiding optical elements can unintentionally in-couple real-world light from real-world light sources. The inadvertently in-coupled real-world light can be diffracted within the light-guiding optical elements toward a user's eyes. The out-coupled real-world light exits the light-guiding optical element in a diffracted manner, thereby generating artifacts in the AR scenario such as a "rainbow" image or artifact appearing within the field of view of the user and/or nearby a virtual object displayed by the light-guiding optical element. The rainbow artifact disrupts the effect of the AR scenario with an incongruous image.

The following disclosure describes various embodiments of systems and methods for creating 3D perception using multiple-plane focus optical elements that address this problem, by including external cover lenses ("windows") to the light-guiding optical elements. In particular, the external windows have a gradient tint to reduce light coming into the light guiding optical elements from above the user (e.g., sunlight, overhead lights, etc.). For example, the gradient tint allows, as an example, 5% of light transmission at a top portion of the lenses and gradually allows more light transmission (e.g., 33%) towards a bottom portion of the lenses. The external windows having a gradient tint are an important component in improving the virtual content solidity by reducing the amount of ambient light to enter the AR system and for blocking/reducing the rainbow artifacts by reducing the amount of overhead light that may inadvertently diffract within the AR system to generate the "rainbow" artifact(s) displayed to the user. The gradient tint allows for balancing of lighting between blocking out bright overhead light to minimize the rainbow artifacts appearing nearby the virtual content and allowing enough ambient light (e.g., reflecting off of actual real-world objects) through the AR system to allow the user to still visibly see and interact with the physical environment.

The increase in perceived virtual content solidity as a result of the reduction in ambient light being unintentionally in-coupled into and out-coupling from the light guiding optical elements may be analogous to, for example, movie theatre house lighting and light sources behind a display screen in a movie theatre environment. For example, as the house lighting inside a movie theatre is reduced, the image quality of the movie being displayed on the screen appears enhanced. As another example, if a light source is inadvertently illuminated behind the display screen, the image quality of the movie being displayed on the display screen may appear greatly reduced. This reduction in image quality may be due to the light source behind the screen drowning out the images of the movie being displayed on the screen. Similarly, while a user is wearing an augmented reality display system, a reduction in the lighting from an overhead real-world light source is similar to a reduction in the lighting in the theatre as far as enhancing the virtual objects displaying to the user. Furthermore, the light source being emitted from the back of the display screen in the theatre is similar to an overhead light source being inadvertently received and displayed by the augmented reality display system. If the overhead light is minimized, the effect of the rainbow artifact is reduced accordingly, while the content solidity of the virtual object displayed to the user is enhanced.

Having a gradient tint exterior lens reduces most of the light coming into the light guiding optical elements from above the user (e.g., sunlight, overhead lights, etc.), thereby reducing the diffraction of the inadvertent in-coupled light that may diffract within the LOE and produce the rainbow artifact(s). The gradient tint reduces more light at a top portion of the lens as opposed to a lower portion of the lens is because bright, ambient light is generally originating from a light source that is usually above a user of an augmented reality system. Examples of typical overhead light sources include sunlight, indoor ceiling lights, outdoor street lights, etc. In other words, most sources of light to brighten a room or a physical environment usually originate from above a user. As such, the external windows to the light-guiding optical element can substantially reduce real-world light from above the user to minimize unintended in-coupling of real-world light into the light-guiding optical element and the rainbow artifacts associated therewith. At the same time, the gradient of the tint allows more light transmission towards the middle portions (e.g., field of view) and yet even more light transmission at the bottom portions of the lens to allow more ambient light from the physical environment to enter the Augmented Reality system for the user to interact with the physical environment and the virtual objects displayed by the AR system.

The controllable gradient tint exterior lenses disclosed herein allow the AR system to respond to changes in external light intensity and direction. The AR system can increase tint when external lighting is relatively higher intensity and/or when the external light originates from a high angle (vs. parallel to the optical axis). Control over the intensity of the tint allows the AR system to reduce inadvertently in-coupled light and the corresponding artifacts, while minimizing the effect on external light transmission to improve the AR scenario.

Illustrative Augmented Reality System(s)

Before describing the details of embodiments of the external windows to the light-guiding optical elements, this disclosure will now provide a brief description of illustrative AR systems.

One possible approach to implementing an AR system uses a plurality of volume phase holograms, surface-relief holograms, or light-guiding optical elements that are embedded with depth plane information to generate images that appear to originate from respective depth planes. In other words, a diffraction pattern, or diffractive optical element ("DOE") may be embedded within or imprinted upon a light-guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3D virtual content to the user, the augmented reality (AR) system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 4:
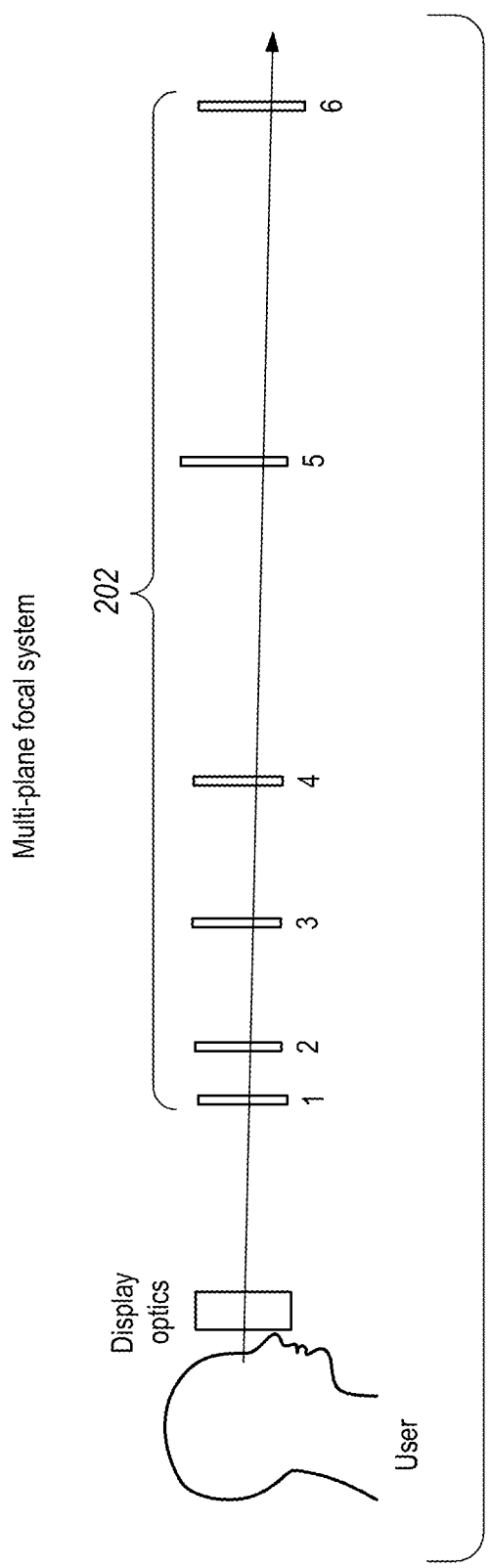
FIG. 4 is a diagram depicting the focal planes of an augmented reality system.

Multiple-plane focus systems create a perception of variable depth by projecting images on some or all of a plurality of depth planes located at respective fixed distances in the Z direction from the user's eye. Referring now to FIG. 4, it should be appreciated that multiple-plane focus systems typically display frames at fixed depth planes 202 (e.g., the six depth planes 202 shown in FIG. 4). Although AR systems can include any number of depth planes 202, one exemplary multiple-plane focus system has six fixed depth planes 202 in the Z direction. In generating virtual content one or more of the six depth planes 202, 3D perception is created such that the user perceives one or more virtual objects at varying distances from the user's eye. Given that the human eye is more sensitive to objects that are closer in distance than objects that appear to be far away, more depth planes 202 are generated closer to the eye, as shown in FIG. 4. In other embodiments, the depth planes 202 may be placed at equal distances away from each other.

Depth plane positions 202 are typically measured in diopters, which is a unit of optical power equal to the inverse of the focal length measured in meters. For example, in one embodiment, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 202 at other distances/diopters. Thus, in generating virtual content at strategically placed depth planes 202, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3D view of the coffee cup.

In one embodiment, the AR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE 190 retaining collimation of light (e.g., depth plane 6 from FIG. 4) may be utilized. Then an image of a closer tree branch may be injected at time 2 and an LOE 190 configured to create an image appearing to originate from a depth plane 10 meters away (e.g., depth plane 5 from FIG. 4) may be utilized; then an image of a pen may be injected at time 3 and an LOE 190 configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

AR systems are required to project images (i.e., by diverging or converging light beams) that appear to originate from various locations along the Z axis (i.e., depth planes) to generate images for a 3D experience. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

FIG. 1 depicts a basic optical system 100 for projecting images at a single depth plane. The system 100 includes a light source 120 and an LOE 190 having a diffractive optical element (not shown) and an in-coupling grating 192 (ICG) associated therewith. The diffractive optical elements may be of any type, including volumetric or surface relief. In one embodiment, the ICG 192 is a reflection-mode aluminized portion of the LOE 190. In another embodiment, the ICG 192 is a transmissive diffractive portion of the LOE 190. When the system 100 is in use, the light beam from the light source 120 enters the LOE 190 via the ICG 192 and propagates along the LOE 190 by substantially total internal reflection ("TIR") for display to an eye of a user. It is understood that although only one beam is illustrated in FIG. 1, a multitude of beams may enter LOE 190 from a wide range of angles through the same ICG 192. A light beam "entering" or being "admitted" into an LOE includes, but is not limited to, the light beam interacting with the LOE so as to propagate along the LOE by substantially TIR. The system 100 depicted in FIG. 1 can include various light sources 120 (e.g., LEDs, OLEDs, lasers, and masked broad-area/broad-band emitters). In other embodiments, light from the light source 120 may be delivered to the LOE 190 via fiber optic cables (not shown).

Figure 2:
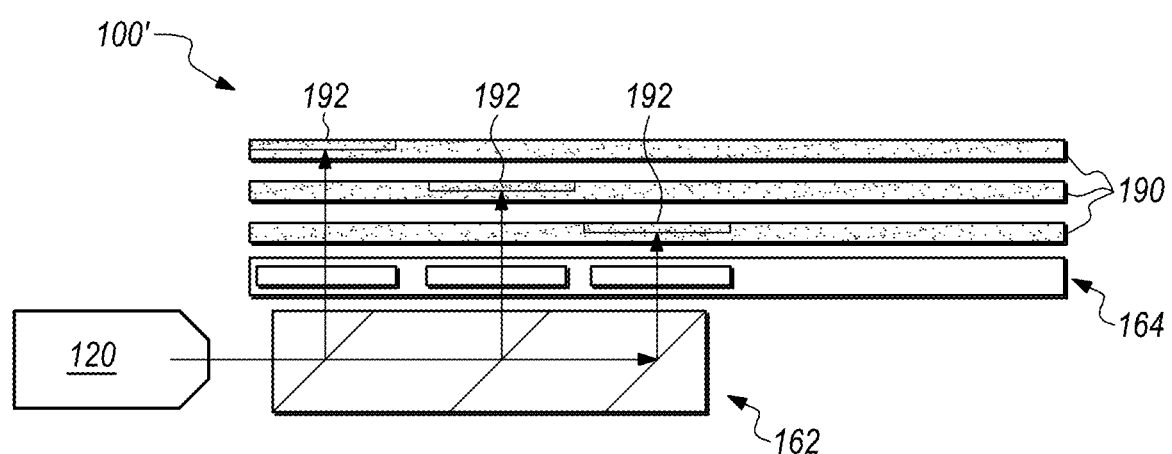

FIG. 2 depicts another optical system 100', which includes a light source 120, three LOEs 190, and three respective in-coupling gratings 192. The optical system 100' also includes three beam-splitters or dichroic mirrors 162 (to direct light to the respective LOEs) and three LC shutters 164 (to control when the LOEs are illuminated). When the system 100' is in use, the light beam from the light source 120 is split into three sub-beams/beamlets by the three-beam-splitters 162. The three beam-splitters also redirect the beamlets toward respective in-coupling gratings 192. After the beamlets enter the LOEs 190 through the respective in-coupling gratings 192, they propagate along the LOEs 190 by substantially TIR where they interact with additional optical structures resulting in display to an eye of a user. The surface of in-coupling gratings 192 on the far side of the optical path can be coated with an opaque material (e.g., aluminum) to prevent light from passing through the in-coupling gratings 192 to the next LOE 190. In one embodiment the beam-splitters 162 can be combined with wavelength filters to generate red, green and blue beamlets. In such an embodiment, three LOEs 190 are required to display a color image at a single depth plane. In another embodiment, LOEs 190 may each present a portion of a larger, single depth-plane image area angularly displaced laterally within the user's field of view, either of like colors, or different colors ("tiled field of view").

Figure 3:
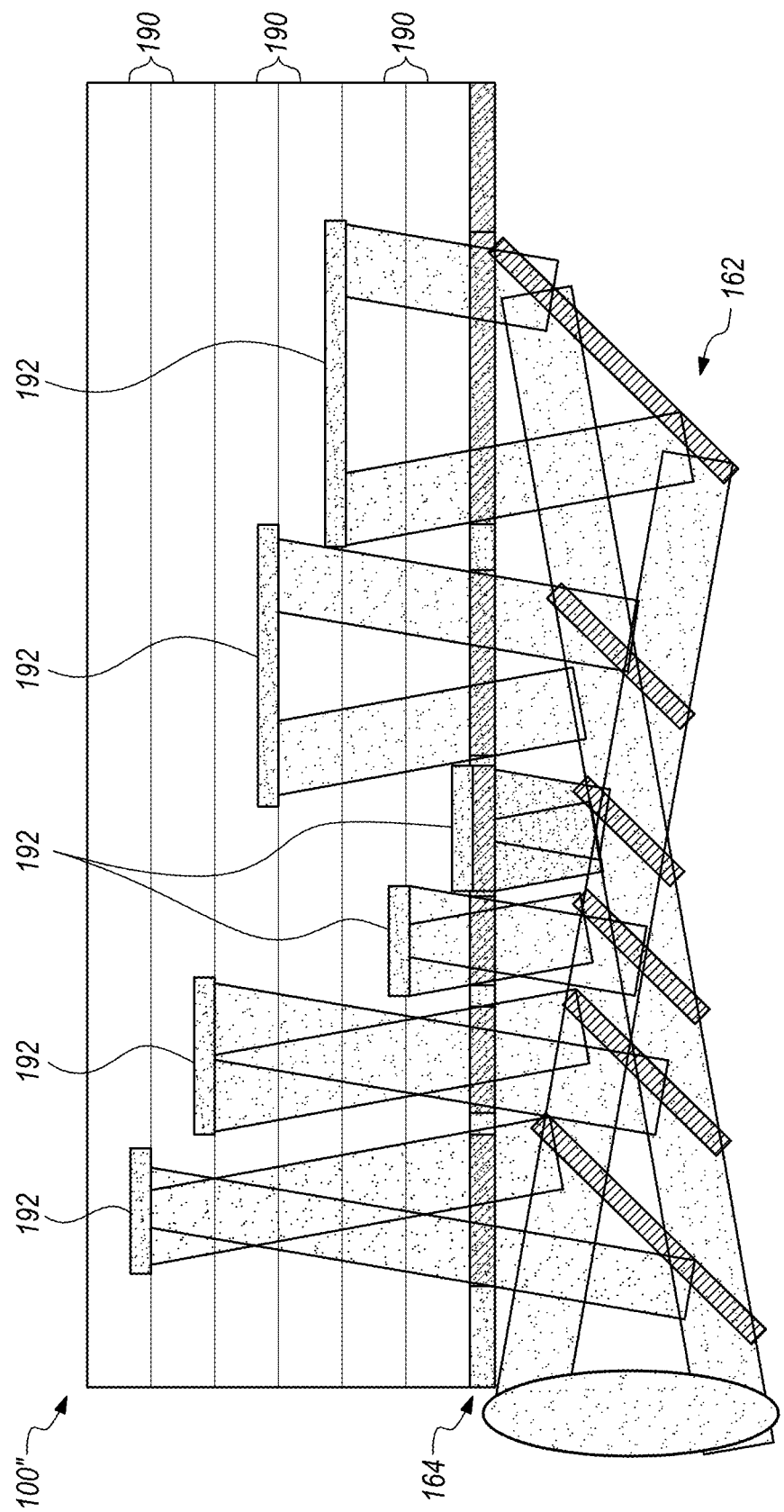

FIG. 3 depicts still another optical system 100", having six beam-splitters 162, six LC shutters 164 and six LOEs 190, each having a respective ICG 192. As explained above during the discussion of FIG. 2, three LOEs 190 are required to display a color image at a single depth plane. Therefore, the six LOEs 190 of this system 100" are able to display color images at two depth planes.

Figure 5:
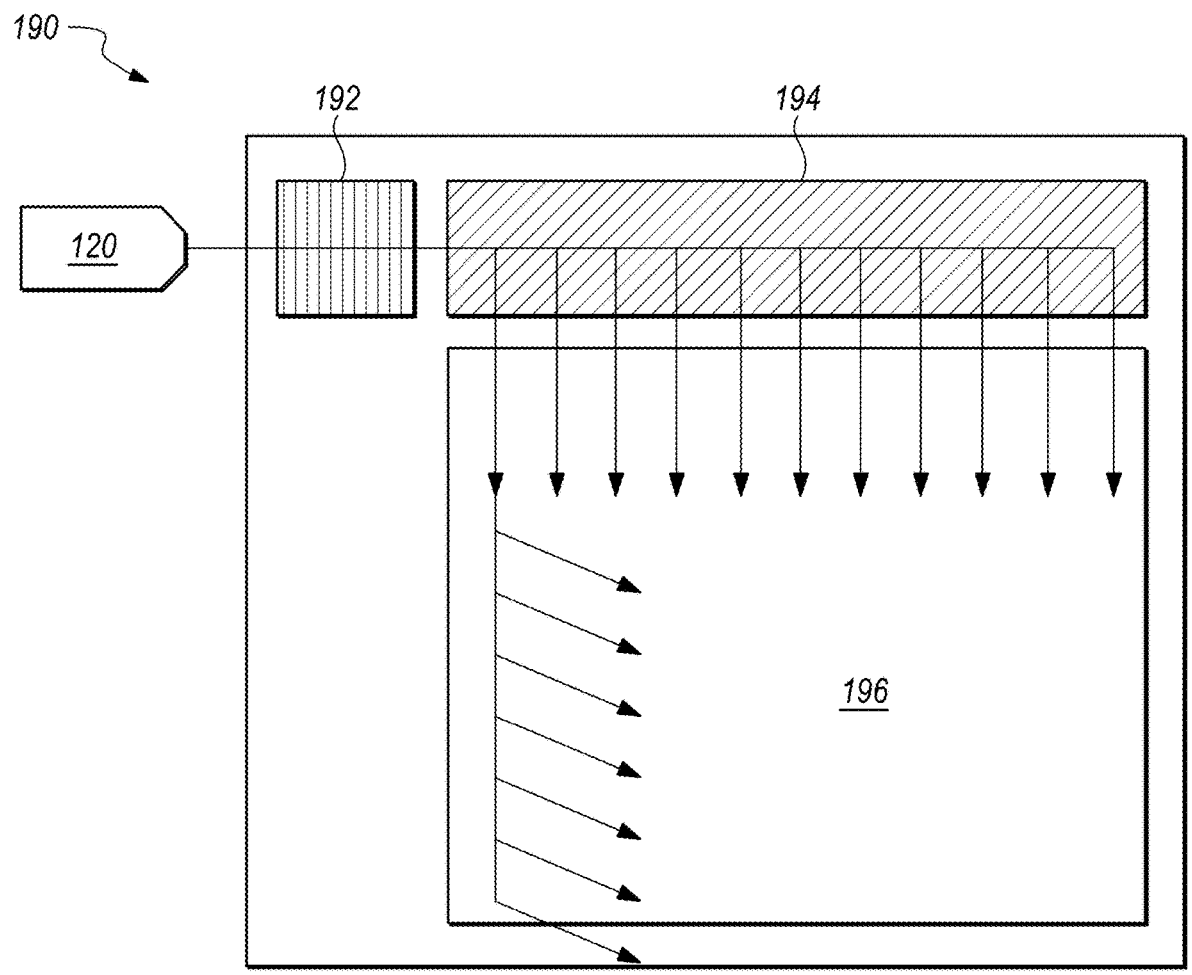
FIG. 5 is a detailed schematic view of a light-guiding optical element of an augmented reality system.

FIG. 5 depicts a LOE 190 having an ICG 192, an orthogonal pupil expander 194 ("OPE"), and an exit pupil expander 196 ("EPE").

As shown in FIGS. 1-4, as the number of depth planes, field tiles, or colors generated increases (e.g., with increased AR scenario quality), the numbers of LOEs 190 and ICGs 192 increases. For example, a single RGB color depth plane requires at least three LOEs 190 with three ICGs 192. As a result, the opportunity for inadvertent in-coupling of real-world light at these optical elements also increases. Further, real-world light can be in-coupled all along an LOE 190, including at out-coupling gratings (not shown). Thus, the increasing number of optical elements required to generate an acceptable AR scenario exacerbates the problem of rainbow artifacts from in-coupled real-world light.

Pupil Expanders

The LOEs 190 discussed above can additionally function as exit pupil expanders 196 ("EPE") to increase the numerical aperture of a light source 120, thereby increasing the resolution of the system 100. Since the light source 120 produces light of a small diameter/spot size, the EPE 196 expands the apparent size of the pupil of light exiting from the LOE 190 to increase the system resolution. In other embodiments of the AR system 100, the system may further comprise an orthogonal pupil expander 194 ("OPE") in addition to an EPE 196 to expand the light in both the X and Y directions. More details about the EPEs 196 and OPEs 194 are described in the above-referenced U.S. Utility patent application Ser. No. 14/555,585 and U.S. Utility patent application Ser. No. 14/726,424, the contents of which have been previously incorporated by reference.

FIG. 5 depicts an LOE 190 having an ICG 192, an OPE 194 and an EPE 196. FIG. 5 depicts the LOE 190 from a top view that is similar to the view from a user's eyes. The ICG 192, OPE 194, and EPE 196 may be any type of DOE, including volumetric or surface relief.

The ICG 192 is a DOE (e.g., a linear grating) that is configured to admit light from a light source 120 for propagation by TIR. In the embodiment depicted in FIG. 5, the light source 120 is disposed to the side of the LOE 190.

The OPE 194 is a DOE (e.g., a linear grating) that is slanted in the lateral plane (i.e., perpendicular to the light path) such that a light beam that is propagating through the system 100 will be deflected by 90 degrees laterally. The OPE 194 is also partially transparent and partially reflective along the light path, so that the light beam partially passes through the OPE 194 to form multiple (e.g., 11) beamlets. In one embodiment, the light path is along an X axis, and the OPE 194 configured to bend the beam lets to the Y axis.

The EPE 196 is a DOE (e.g., a linear grating) that is slanted in the axial plane (i.e., parallel to the light path or the Y direction) such that the beamlets that are propagating through the system 100 will be deflected by 90 degrees axially. The EPE 196 is also partially transparent and partially reflective along the light path (the Y axis), so that the beamlets partially pass through the EPE 196 to form multiple (e.g., 7) beamlets. The EPE 196 is also slated in a Z direction to direction portions of the propagating beam lets toward a user's eye.

The OPE 194 and the EPE 196 are both also at least partially transparent along the Z axis to allow real-world light (e.g., reflecting off real-world objects) to pass through the OPE 194 and the EPE 196 in the Z direction to reach the user's eyes. In some embodiments, the ICG 192 is at least partially transparent along the Z axis also at least partially transparent along the Z axis to admit real-world light. However, when the ICG 192, OPE 194, or the EPE 196 are transmissive diffractive portions of the LOE 190, they may unintentionally in-couple real-world light may into the LOE 190. As described above this unintentionally in-coupled real-world light may be out-coupled into the eyes of the user forming rainbow artifacts.

The Rainbow Artifact Problem

Figure 6:
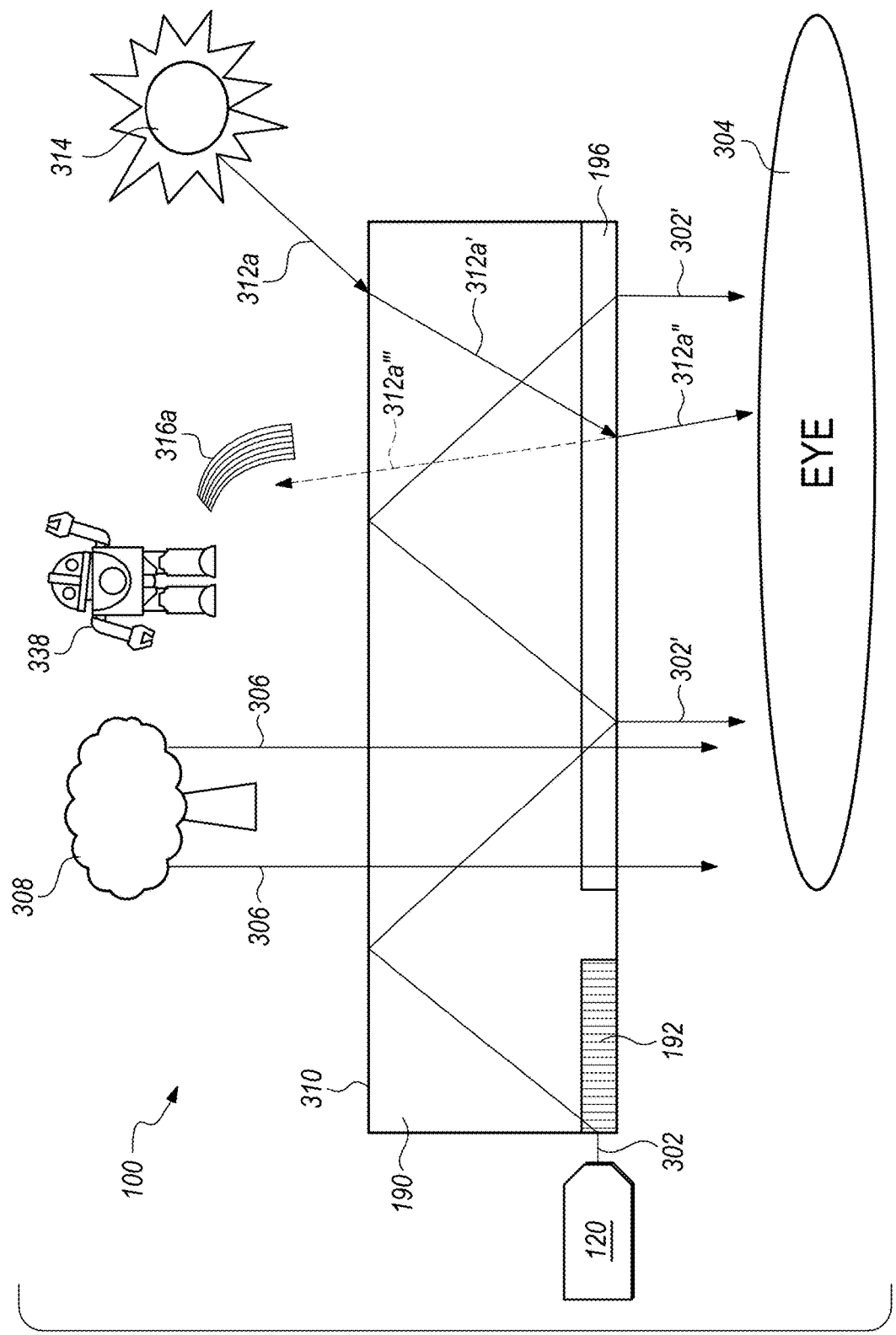
FIG. 6 is an edge-on schematic view of a prior art light-guiding optical element of an augmented reality system.

FIG. 6 is an edge-on schematic view of a prior art AR system 100 having an LOE 190. The LOE 190 is similar to the one depicted in FIG. 5, but only the ICG 192 and the EPE 196 are depicted FIG. 6, with the OPE 194 omitted for clarity. Several exemplary light beams from various sources are illustrated to demonstrate the rainbow artifact problem mentioned above. A virtual light beam 302 generated by a light source 120 is in-coupled into the LOE 190 by the ICG 192. The virtual light beam 302 carries information for a virtual object 338 (e.g., a virtual robot) generated by the AR system 100.

The virtual light beam 302 is propagated through LOE 190 by TIR, and partially exits each time it impinges on the EPE 196. In FIG. 6, the virtual light beam 302 impinges two locations on the EPE 196. The exiting virtual light beamlets 302' address a user's eye 304 at an angle determined by the AR system 100. The virtual light beamlets 302' depicted in FIG. 6 are substantially parallel to each other. The virtual light beam lets 302' will therefore render an image (e.g., a virtual object 338 of a virtual robot) that appears to originate from near infinity. The virtual light beamlets 302' can address a user's eye 304 at a wide range of angles relative to each other to render images that appear to originate from a wide range of distances from the user's eye.

The LOE 190 is also transparent to real-world light beams 306, such as those reflecting off of real-world objects 308 (e.g., a distant tree). Because the tree 308 depicted in FIG. 6 is distant from user's eye 304, the real-world light beams 302 are substantially parallel to each other. The real-world light beams 306 pass through the LOE 190 because the LOE 190 is transparent to light. Real-world objects 308 at distances closer to the user's eye 302 will diverge from each other but will still substantially pass through the LOE 190.

The problem is that this prior art LOE 190 also in-couples (by refraction) overhead real-world light beams 312*a* (e.g., overhead light sources such as sunlight, ceiling lights, street lights, etc.) from above the user that address the LOE 190 at a top portion of the LOE 190. The top portion of the LOE 190 corresponding to a world side top portion such as, for example, a top portion of a headset when the headset is worn as designed and the user is standing or sitting upright. For instance, the overhead real-world light source 314 above the user (e.g., the sun) depicted in FIG. 6 is at an overhead position relative to the LOE 190. While the sun 314 is depicted to the right of the LOE 190, the sun 314 can be, and typically is, high in the sky above the LOE 190. Since the sunlight from the sun is typically above the user, the sunlight would enter the headset from a world side top portion, while most light beams from physical objects within the user's physical environment are entering the headset more at a field of view portion of the headset (assuming the user is looking at the physical objects) as opposed to the world side top portion of the headset that the overhead light sources are entering through.

The sun 314 is an overhead real-world light source 314 that can generate rainbow artifacts 316*a* because it is also bright. Other objects 314 that can generate rainbow artifacts 316*a* include overhead light sources (e.g., ceiling lamps, street lights, etc.) that happen to impinge on an LOE 190 from above the user. The brightness of the overhead real-world light source may cause diffraction within the LOE 190 and thus, generate the rainbow artifact nearby the virtual object 338 generated from the light source 302. Diffraction is a process by which light waves break up into dark and light bands or into the colors of the spectrum. Light passing through a narrow opening in the blinds, causing bright and dark shadows and patterns to fall across the floor is an example of diffraction.

As shown in FIG. 6, the overhead real-world beam 312*a* can be in-coupled into the LOE 190 at an exterior surface 310 of the LOE 190. Due to the index of refraction of the material from which the LOE 190 is made, the in-coupled overhead real-world beam 312*a*' changes trajectory from the overhead real-world beam 312*a*. Finally, when the in-coupled overhead real-world beam 312*a*' impinges on the EPE 196, it exits the LOE 190 as an exiting overhead real-world beam 312*a*" with a further changed trajectory. As shown in FIG. 6, the exiting overhead real-world beam 312*a*" renders a rainbow image/artifact 316*a* in the field of view nearby the virtual object 338. In FIG. 6, the rainbow image/artifact 316*a* appears to originate in a location nearby the virtual object 338. The juxtaposition of the unintended rainbow image/artifact 316*a* by the virtual object 338 can disrupt the intended effect of the AR scenario.

Because AR systems 100 require some degree of transparency to real-world light beams 306, their LOEs 190 have the problem of unintended in-coupling of overhead real-world light beams 312*a*, and the rainbow artifacts generated when the in-coupled overhead real-world beam 312*a*" exits the LOE 190. While singles beams and beamlets are depicted in FIG. 6, it should be appreciated that this is for clarity. Each single beam or beamlet depicted in FIG. 6 represents a plurality of beams or beamlets carrying related information and having similar trajectories. While the embodiments herein are describes with respect to reducing the rainbow artifact, the embodiments may also reduce other optical artifacts resulting from inadvertent in-coupling of external light.

External Covering Lens to the Light-Guiding Optical Elements

Figure 7:
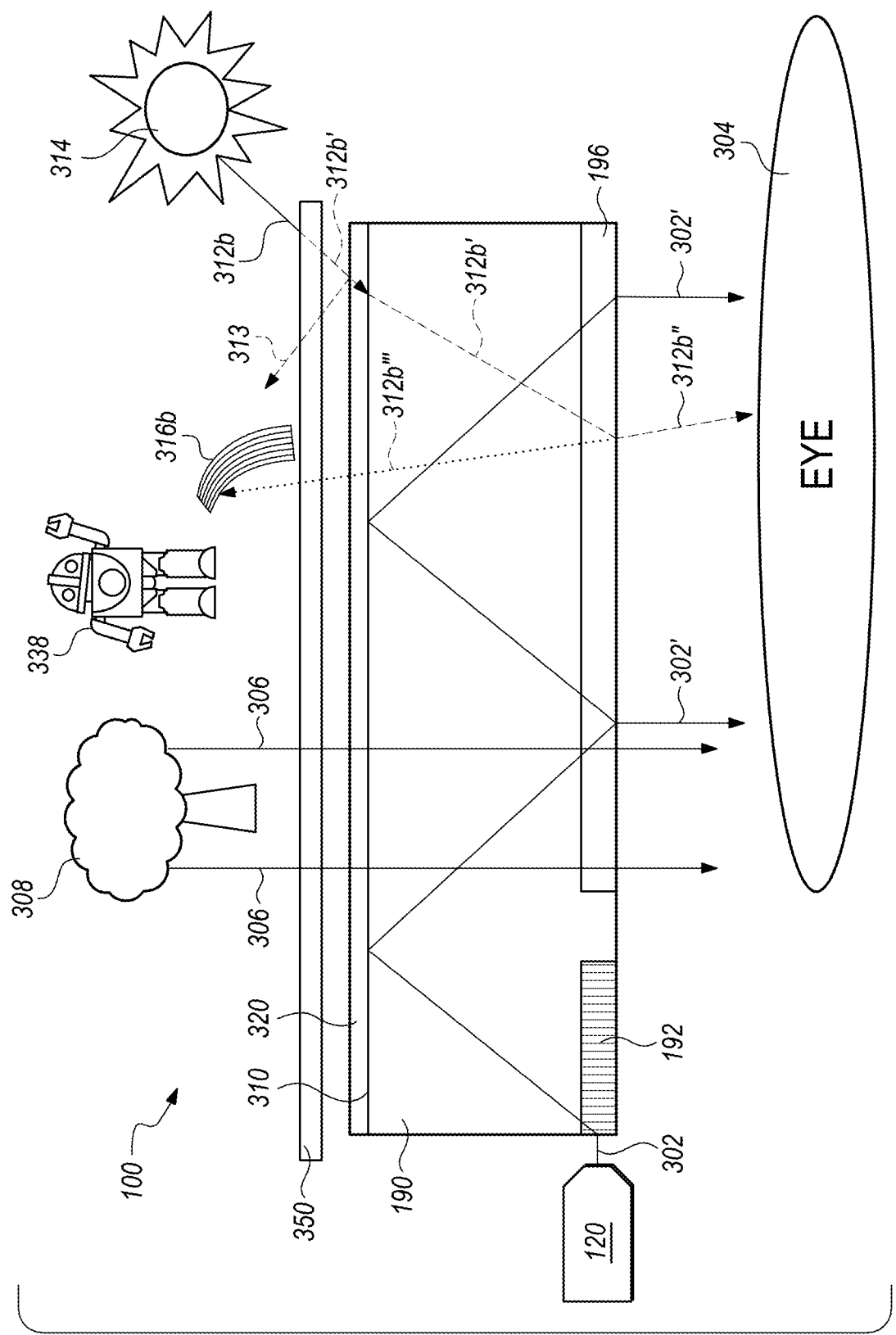
FIG. 7 is an edge-on schematic view of a lens disposed adjacent and exterior to a light-guiding optical element of an augmented reality system, according to some embodiments of the present disclosure.

FIG. 7 is an edge-on schematic view of a lens disposed adjacent and exterior to a light-guiding optical element of an augmented reality system, according to some embodiments of the present disclosure. The LOE 190 has an ICG 192, an OPE (not shown), an EPE 196, and a lens 350. The lens 350 is disposed adjacent and exterior to a surface 310 of the LOE 190. The lens 350 can be configured to include a tint to absorb real-world light via the tint such that the amount of real-world light transmitting through the tinted lens to transmit through the lighting guiding optical element (e.g., LOE 190) is reduced. The tinted lens may also be configured as a gradient tinted lens to absorb more real-world light (e.g., reduce more light/transmit less light) at a world side top portion of the lens to minimize the "rainbow" artifact generated from bright overhead light sources and absorb less real-world light (e.g., reduce less light/transmit more light) at a world side bottom portion of the lens to allow enough light to transmit through the LOE 190. The amount of real-world light transmitted through the gradient lens may be expressed as a transmission average ("$T_{avg}$") such that 5% of light being transmitted through the lens is expressed as $T_{avg}=5\%$ and 33% of light being transmitted through the lens is expressed as $T_{avg}=33\%$.

For example, in FIG. 7, the sun 314, is overhead/above the user of the augmented reality system. The real-world overhead light source 314 (e.g., the sun) emits overhead real-world light beams 312b. As the overhead real-world light beams enter the lens 350 at a top portion of the gradient tinted lens (e.g., depicted as the right side of FIG. 7), a large percentage of the overhead real-world light beams 312b is absorbed within the tint of the lens 350 such that reduced real-world light beams 312b' (shown as dashed lines) are transmitted through the lens 350 to transmit through the transparent LOE 190. For example, if the top portion of the lens 350 has a gradient tint with a $T_{avg}$ of 5%, then only 5% of the overhead real-world light beams 312b (e.g., reduced real-world light beams 312b') is transmitted through the lens 350 to transmit through the LOE 190.

As the reduced real-world light beams 312b' exits the LOE 190, the reduced real-world light beams 312b' may still be diffracted by elements within the LOE 190 such that diffracted light beams 312b" may enter the eye 304 of the user, thus creating the reduced rainbow artifact 316b perceived by the user of the AR system. Note, the rainbow artifact 316a in FIG. 6 appears significantly brighter than the reduced rainbow artifact 316b in FIG. 7 because in FIG. 6, the overhead real-world light beams 312a are entering the LOE 190 with its full intensity (e.g., without the lens 350 having the gradient tint absorbing a portion of the light 312b as illustrated in FIG. 7, or any tint for absorbing any portion of the overhead light). At full intensity, the diffraction of the light beams 312a" into the eye is much more intense and bright, thus providing the rainbow artifact 316a perceived by the user as a brighter rainbow effect than the reduced rainbow artifact 316b in FIG. 7, which minimizes the rainbow effect as compared to FIG. 6. Since the reduced real-world light beams 312b' is less intense than the real-world light beams 312a', the intensity and brightness of the reduced real-world light beams 312b' produces a less bright and less intense rainbow artifact 316b.

As discussed above, there is a balance between how much light should be permitted through the lens 350 to maintain the augmented reality feel of virtual content displayed with enough lighting of the physical environment of the user and how much light should be blocked by the lens 350 to minimize the rainbow artifact.

Figure 8:
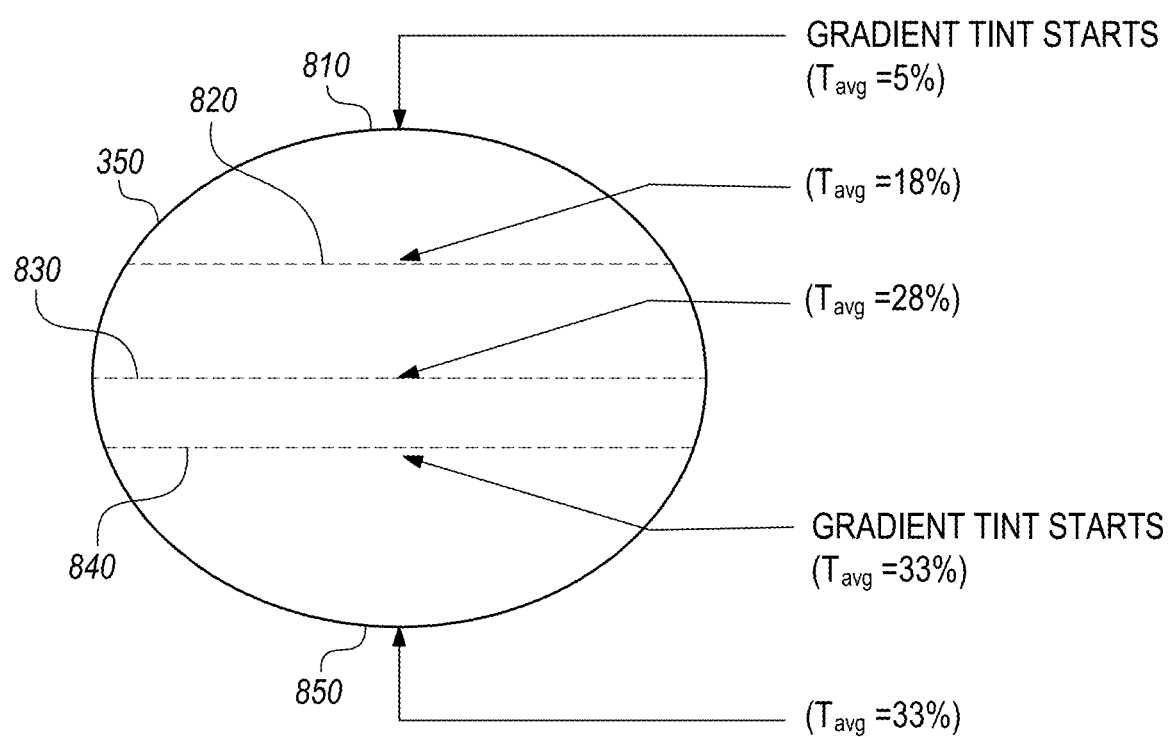
FIG. 8 is front view of a gradient tinted lens of an augmented reality system, according to some embodiments of the present disclosure.

FIG. 8 is front view of a gradient tinted lens of an AR system, according to some embodiments of the present disclosure. Note the dashed lines depicted in FIG. 8 merely illustrate an imaginary line across a y-axis of the lens that has uniform/fixed degree of tint. The lens 350 has a variable tint such that the variable of tint is a function of geometry. The degree of tint at any given location is fixed relative to the y-axis of the lens 350. Transmission percentage of the tint (e.g., $T_{avg}$) is determined by balancing the perception of opacity of virtual content by the user (e.g., opacity improves with less external light transmission), decreased rainbow artifact (e.g., improves with less external light transmission), and allowing enough external light transmission for the user to be able to clearly see/interact with the real world (which improves with more external light transmission). Transmission (e.g., $T_{avg}$) measured at various points on the EPE is shown in FIG. 8 and specs are defined at each of the various points. In some embodiments, a "sweet spot" transmission percentage gradient (e.g., shown in FIG. 8) provides substantially rainbow-free content at acceptable opacity while allowing a user to see enough world light to interact with physical objects seen by the user through the AR system of the real world.

As discussed above, the gradient tint controls (a) the ambient light effect of rainbow artifacts through the lens assembly and (b) brightness that drowns out or enhances virtual content perception. The lens 350 has various $T_{avg}$ values relative to the y-axis of the lens. As illustrated in FIG. 8, in some embodiments, the gradient tint lens may include a top edge 810 of the lens where the tint at the top edge 810 may have, as an example, a $T_{avg}$ of 5%. At position 820 relative to the y-axis of the lens, the tint may have, as an example, a $T_{avg}$ of 18%. This area of the lens 350 having the gradient tint (e.g., between the top edge 810 and position 820) may be referred to herein in the present disclosure as a top portion of the gradient tint lens.

At position 830 relative to the y-axis of the lens, the tint may have, as an example, a $T_{avg}$ of 28% which absorbs less light entering at position 830 and at position 840, a $T_{avg}$ of 33%. As indicated in FIG. 8, the gradient tint may end at position 840 with a $T_{avg}$ of 33% such that the area of the lens 350 between position 840 to the bottom edge 850 of the lens may be referred to herein in the present disclosure as a bottom portion of the gradient tint lens. In other embodiments, the $T_{avg}$ and the different positions (e.g., 820, 830 and 840) may differ, based on additional optimization testing.

Gradient is neutral density such that each wavelength of light is equally absorbed so that external light transmitted through the window appears neutral to the user in terms of temperature and tint; gradient is a true gray. In some embodiments, the $T_{avg}$ is gradually increased in a linear fashion from the $T_{avg}$ of 5% at the top edge 810 to the $T_{avg}$ of 33% at position 840 of the lens 350. One of ordinary skill in the art may appreciate the actual values of $T_{avg}$s at the various y-axis of the lens disclosed in the present disclosures are merely example configurations to strike a balance between the control of ambient light effect of the rainbow artifacts and the brightness that drowns out virtual content perception.

Referring back to FIG. 7, in some embodiments, the augmented reality system may also include a selectively reflective coating 320 (e.g., a diverter) to reflect overhead light sources from inadvertently being in-coupled into the LOE 190. The selectively reflective coatings can be angularly selective such that the coated optical elements are substantially transparent to real-world light with a low angle of incidence ("AOI"; e.g., near 90 degrees from the surface of the optical element). At the same time, the coating renders the coated optical elements highly reflective to oblique real-world light with a high AOI (e.g., nearly parallel to the surface of the optical element; about 170 degrees).

The combination of both the gradient tint lens and the selectively reflective coating 320 may greatly reduce the rainbow artifacts resulting from, as an example, overhead lighting such as sunlight and/or ceiling lighting, etc. Because the sunlight and/or the ceiling light may impinge upon the reflective coating 320 from a relatively high AOI, the light beam 312b may be reflected as illustrated by reflected light beam 313, thereby further reducing the amount of overhead light from entering the LOE 190. The selectively reflective coating 320 is disposed on an external surface 310 of the LOE 190. The selectively reflective coating 320 can be configured to reflect light having a variety of characteristics, depending how the coating 320 is "tuned." In one embodiment, the coating is tuned to selectively reflect light impinging upon the coating 320 at a relatively high AOI, while allowing light impinging upon the coating 320 at a relatively low AOI to pass through the coating. The coating 320 is also tuned to allow relatively low AOI light to pass therethrough without noticeably changing the angle of trajectory thereof. More details about the coating 320 (e.g., diverter) are described in the above-referenced U.S. Utility patent application Ser. No. 15/479,700, the contents of which have been previously incorporated by reference.

Alternatively, or additionally, the reflective coating 320 (e.g., diverter), such as the one depicted in U.S. Utility patent application Ser. No. 15/479,700, can be incorporated into a coating of the lens 350 to reflect overhead light and thereby further reducing the amount of overhead light that may be transmitted through the lens 350 to be transmitted through the LOE 190.

While single beams and beamlets are depicted in FIG. 6 and FIG. 7, it should be appreciated that this is for clarity. Each single beam or beamlet depicted in FIG. 6 and FIG. 7 represents a plurality of beams or beamlets carrying related information and having similar trajectories.

While the lens 350 having the gradient tint may reduce the field of view by reducing real-world overhead light, reduction or minimization of rainbow artifacts is a benefit that can outweigh the cost of a reduced lighting of a user's field of view. Further, the gradient tint of lens 350 may be tuned to reduce rainbow artifacts while retaining an acceptable field of view. In fact, reducing the overhead light improves the content solidity of virtual objects displayed within the field of view as discussed above.

While the embodiments described herein include a gradient tint lens, one of ordinary skill in the art may appreciate the gradient tint lens may comprise a lens 350 having a gradient tint coating applied to a surface of the lens 350. In some embodiments, an optical coating may be applied to a surface of the lens, the optical coating may include a gradient tint coating, an anti-reflection coating, a hard coating, a mirror coating, an anti-smudge coating, and/or an orientation marking. The orientation markings providing markers to line up gradient during assembly. In some embodiments, the gradient tint lens is elliptical, not circular. One of ordinary skill in the art may appreciate the shape of the gradient tint lens may be of different shapes other than elliptical or circular and that the shape of the lens may be a function of use cases to solve certain problems. Orientation markings are further disclosed below.

In some embodiments, the gradient of tint may be a gradient film attached to the protective lens. In some embodiments, the gradient of tint may be manufactured directly into the lens itself. In some embodiments, the gradient of tint may be coated onto the surface 310 of the LOE 190 such that an external lens may not be used as a light absorbing structure, but instead as a protective structure.

In some embodiments, blocking external overhead light transmission may be accomplished by a combination of absorbing some external light (gradient tint) and reflecting some external light (e.g., a diverter such as a reflective and/or mirror coating)

In some embodiments, the lens material may be, as an example, a Trivex material which is approximately 1 mm in thickness which may (a) withstand drop specifications; (b) have minimal (ideally zero) distortion/optical power applied to external light that transmits through the external window; and (c) have an index of refraction=1.58 which is approximately the same as a waveguide glass index of refraction. In other embodiments, the lens material may be, as an example, a polycarbonate. And yet in other embodiments, the lens material may be, as an example, plastic and/or glass.

In some embodiments, the lens 350 is geographically modulated relative to an eye-box instead of an EPE 196. The eye-box may be a box that provides a means of viewing or observing in a particular way. The eye-box may be a volume of space within which an effectively viewable image is formed by the lens system or visual display (e.g., the augmented reality system), representing a combination of exit pupil size and eye relief distance.

FIG. 9 illustrates multiple views of flat periphery surfaces around an edge of the lens 350 of an augmented reality system, according to some embodiments of the present disclosure. The lens 350 may include outward facing surface 910, an inward facing surface 920, a first flat periphery surface 930 having a flat surface width 950, and a second flat periphery surface 940 having a flat surface height of 960. The first flat periphery surface 930 and the second flat periphery surface 940 being configured around the edge of the gradient lens to permit interfacing and/or sealing with a mount, an eyeglass frame, and/or an AR headset, all hereinafter may be referred to as a "mount".

Legacy lens designs generally include curved or rounded periphery surfaces of the lens to facilitate simple snap-on/snap-off configuration and assembly of the lens to the its respective mounts. However, the present disclosure includes flat periphery surfaces 930 and 940 around the edge of the lens 350 to facilitate interfacing and/or sealing with the mount. For example, some embodiments may rely on the flat periphery surfaces of the lens because the lens 350 is a protective cover lens that is disposed adjacent and exterior to the surface of the light guiding optical elements to protect the light guiding optical elements from physical contact with external objects in a user's physical environment. Having a rounded edge lens that may pop out of the mount upon contact with external objects in the user's physical environment may not serve its purpose to protect the light guiding optical elements. Therefore, in some embodiments, the lens 350 may include flat periphery surfaces to permit interfacing/sealing with a mount.

The measurements of flat surface width 950 and the flat surface height 960 may be dependent upon flat surface areas of the mounts for attachments. In some embodiments, the flat surface areas of the mounts may be dependent upon the flat surfaces of width 950 and the flat surface height 960 because the measurements of the flat periphery surfaces (e.g., 950 and 960) may be dependent on a thickness of the lens 350, the curvature of the lens 350, or a combination thereof.

In some embodiments, the shape of the lens 350 may include a flat portion around the edge where adhesive is applied during assembly of the external window (e.g., lens 350) to a magnesium mount/frame. Sunglass lenses generally include a chamfered bevel that allows the lens to snap into mounts/frames wherein the mounts/frames may have some flexibility. However, in some embodiments that include a magnesium mount/frame, no such flexibility is available. Therefore, the lenses must be glued on.

In some embodiments, the lens 350 may include at least one or more coatings such as a gradient tint coating, a hard coating, a mirror coating, an anti-smudge coating, and/or an anti-reflection. The lens 350 may have a center thickness of 1.20 +/−0.2 mm. The lens 350 may have a radius of curvature of 86.8 +/−0.9 mm.

Figure 10:
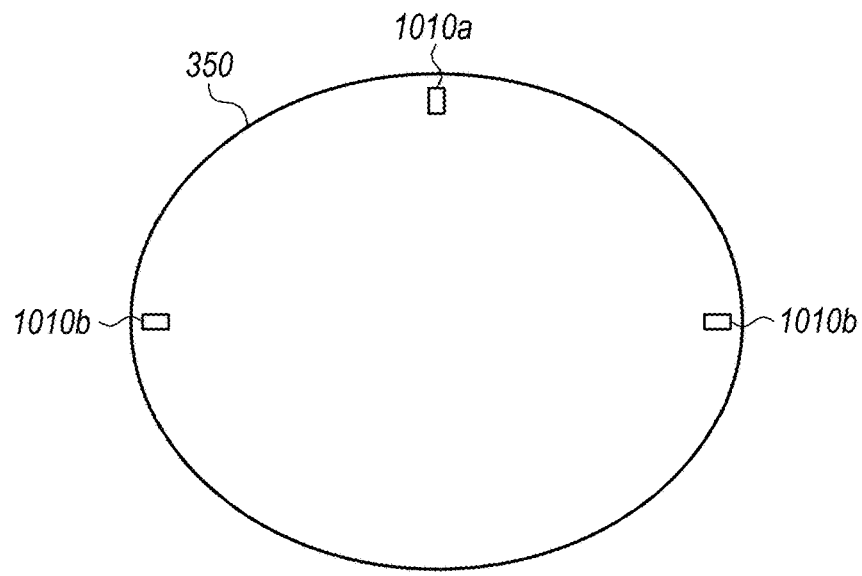
FIG. 10 is a front view of the gradient tinted lens of an augmented reality system, according to some embodiments of the present disclosure.

FIG. 10 is a front view of the lens 350 of an augmented reality system, according to some embodiments of the present disclosure. The external lens/window (e.g., the lens 350) may not be uniform in size and shape (e.g., an elliptical, circle, square, etc.). The lens 350 has gradient tinting and is not a perfect circle. Alignment/orientation markers 1010 may be used during assembly to make sure that the lens is oriented correctly in its mount. Orientation markers may be placed at east, north, and west locations relative to the lens 350 as depicted in FIG. 10. In legacy embodiments, ink used for the alignment markers 1010 is wiped off after assembly of the lens to its mount is complete so that the user does not see the orientation marks. Because the alignment/orientation markers 1010 are removed, the external window (e.g., lens 350) cannot be re-attached to its mount once the alignment/orientation marker 1010 is removed from the mount for, as an example, maintenance of the AR system.

In some embodiments, a special kind of ink may be used as the alignment/orientation markers 1010. The special kind of ink can be visible under certain kinds of light in a factory or repair facility. However, the special kind of ink would not be visible to a user during regular use of AR system. The special kind of ink could then be left on the external lens after the initial assembly of the lens to the eyeglass frame so that the lens could be re-used and re-assembled after maintenance work is completed on the lens or the eyeglass frame. In some embodiments, the special kind of ink may be infrared (IR) ink or ultraviolet (UV) fluorescent ink. In some embodiments, the marking material and/or marking process may be developed by, as an example, Essilor®.

Controllable External Covering Lens Systems

Figure 11:
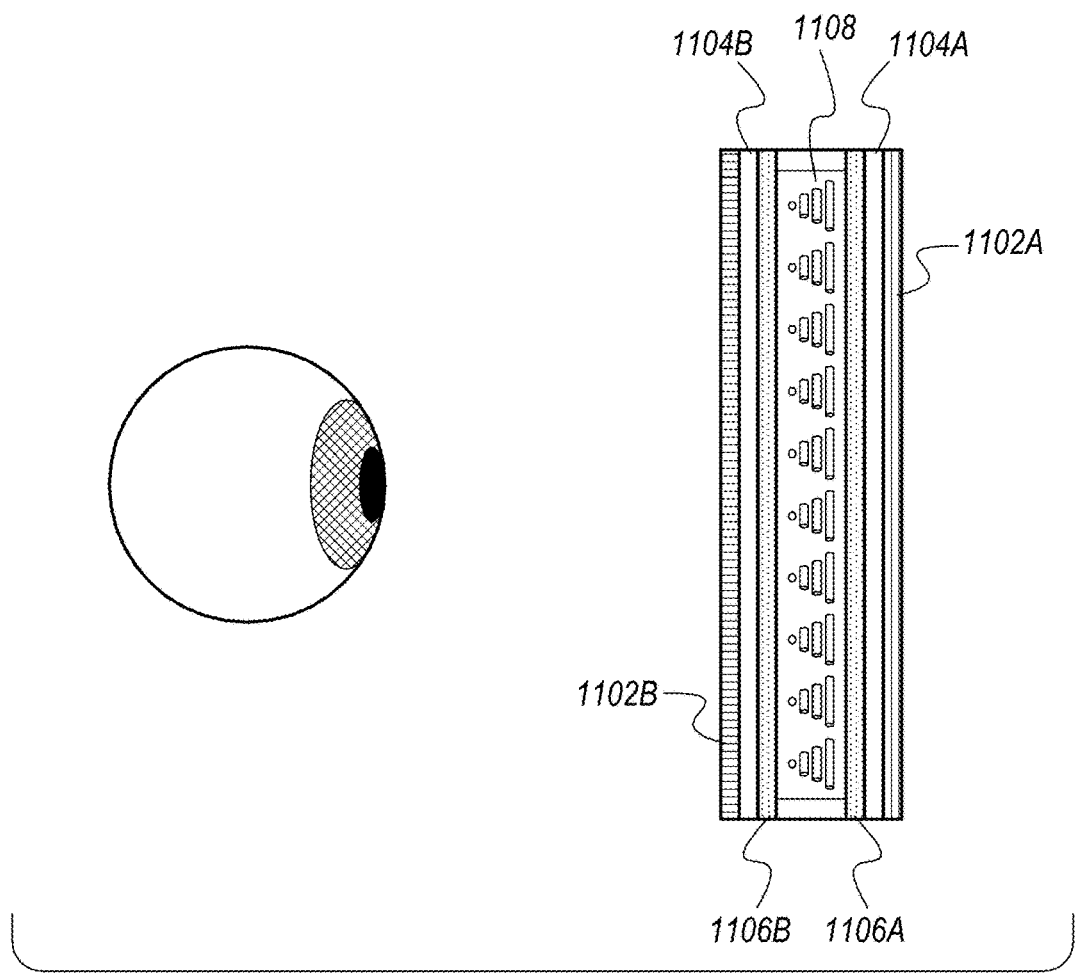
FIG. 11 is a schematic side view of a controllable dimming assembly that may form all or part of an external covering lens of an augmented reality system, according to some embodiments of the present disclosure.

FIG. 11 illustrates a controllable dimming assembly that may form all or part of an external covering lens of a system (e.g., an augmented reality system), according to some embodiments of the present disclosure. More specifically, FIG. 11 depicts a controllable dimming assembly that includes a liquid crystal layer 1108 sandwiched between an outer electrode 1106A and an inner electrode 1106B, which are in turn sandwiched between an outer polarizer 1102A and an inner polarizer 1102B. In some examples, the controllable dimming assembly may further include an outer compensation film layer 1104A (or waveplate) positioned between the outer polarizer 1102A and the outer electrode 1106A, an inner compensation film layer 1104B (or waveplate) positioned between the inner polarizer 1102B and the inner electrode 1106B, or both.

In operation, the outer polarizer 1102A may impart a first polarization state (e.g., vertical polarization) to ambient light propagating therethrough toward a user's eye. Next, liquid crystal molecules contained within the liquid crystal layer 1108 may further rotate/polarize the polarized ambient light in accordance with one or more electric fields applied across outer and inner electrodes 1106A, 1106B. It follows that the polarization rotation imparted by the pair of electrodes 1106A, 1106B and liquid crystal layer 1108 may serve to effectively alter the polarization state of ambient light passing therethrough. In some examples, retardation and/or additional polarization rotation may be imparted by way of outer and/or inner compensation film layers 1104A, 1104B.

Lastly, the inner polarizer 1102B may impart a second, different polarization state (e.g., horizontal polarization) to ambient light propagating therethrough toward a user's eye. The second polarization state may be configured to be nearly orthogonal to the cumulative polarization state imparted on the ambient light by the combined effects of the outer polarizer 1102A, the liquid crystal layer 1108, and optionally the outer and/or inner compensation film layers 1104A, 1104B. Accordingly, the inner polarizer 1102B may allow portions of ambient light in the second polarization state to pass therethrough unaffected, and may attenuate portions of ambient light in polarization states other than the second polarization state.

In some implementations, the controllable dimming assembly of FIG. 11 may be configured to generate a gradient or otherwise non-uniform tinting/dimming pattern to attenuate ambient light incident thereon, in a manner similar to that of lens 350 (see FIG. 7). The controllable dimming assembly of FIG. 11 may be configured to generate the gradient upon application of one or more electric fields/voltages across the outer and inner electrodes 1106A, 1106B. Examples of such patterns are shown in FIGS. 12A-12D. In addition, the system to which the controllable dimming assembly of FIG. 11 belongs may effect adjustments in the global level of opacity of such a spatially-varying dimming pattern over time based on any of a variety of different factors. In some examples, the controllable dimming assembly may be configured to attenuate ambient light passing therethrough in accordance with a gradient tinting/dimming pattern by way of at least one component thereof (e.g., outer polarizer 1102A, inner polarizer 1102B, outer compensation film layer 1104A, inner compensation film layer 1104B, outer electrode 1106A, inner electrode 1106B, circuitry electrically coupled to outer electrode 1106A and/or inner electrode 1106B, substrate material disposed adjacent liquid crystal layer 1108, outer electrode 1106A, and/or inner electrode 1106B, etc.) that is configured to impart polarization states that vary on the basis of the location and/or angle at which the ambient light is incident such a component.

As described in further detail below, one or both of outer and inner polarizers 1102A, 1102B may be configured to polarize ambient light passing therethrough in a spatially-varying or otherwise non-uniform manner. For example, the outer polarizer 1102A may be configured to impart a particular polarization state to ambient light incident one portion/section thereof, but impart other, different polarization states to ambient light incident other portions/sections thereof.

In addition, in some implementations in which the controllable dimming assembly includes at least one compensation film layer (e.g., one or both of outer and inner compensation film layers 1104A, 1104B), such a compensation film layer 1104A, 1104B may be configured so as to polarize/rotate/retard ambient light passing therethrough in a manner varying on the basis of the location and/or angle at which the ambient light is incident the compensation film layer 1104A, 1104B. In some implementations, the compensation film layer 1104A, 1104B may be configured to interact with light impinging thereon in a manner similar to that of coating 320, as described above with reference to FIG. 7 and described in additional detail in U.S. Utility patent application Ser. No. 15/479,700, the entirety of which is incorporated herein by reference. For example, the outer compensation film layer 1104A may be configured to polarize/rotate/retard ambient light incident one portion/section thereof by a particular amount, but polarize/rotate/retard ambient light incident other portions/sections thereof by other, different amounts. In another example, the outer compensation film layer 1104A may be configured to polarize/rotate/retard ambient light incident a surface thereof at a particular angle by a particular amount, but polarize/rotate/retard ambient light incident said surface thereof at other angles by other, different amounts.

Furthermore, in some examples, one or more of outer and inner electrodes 1106A, 1106B may be configured to produce spatially-varying or otherwise non-uniform electric fields therebetween, which may in turn create liquid crystal phase non-uniformity in the liquid crystal layer 1108 such that the liquid crystal layer 1108 polarizes/rotates/retards ambient light passing therethrough in said spatially-varying or otherwise non-uniform manner. For example, the outer electrode 1106A may be configured to produce a relatively strong electric field at one end thereof, but produce a relatively weak electric field at another, different end thereof. The one end and the different end may be opposite ends along a direction on the outer electrode 1106A. This direction may correspond to from a bottom to a top of the liquid crystal layer 1108. In various embodiments, the liquid crystal layer 1108 may employ liquid crystal technology such as dye doped or guest host liquid crystals, twisted nematic (TN) or vertically aligned (VA) liquid crystals, or ferroelectric liquid crystals. In some implementations, the liquid crystal layer 1108 may employ electrically controlled birefringence (ECB) technology, such as an ECB cell.

Much like the external covering lenses described above with reference to FIGS. 8-10, in some implementations, the geometry of the controllable dimming assembly of FIG. 11 may feature one or more rounded or curved edges and/or surfaces. In some embodiments, the geometry of the controllable dimming assembly of FIG. 11 may be shaped to follow the contours of a frame to which the controllable dimming assembly is physically coupled. In some of these embodiments, the frame may be configured to be worn about a head of the user. As such, in some embodiments, a pair of controllable dimming assemblies may be physically coupled to the frame such that, when the frame is worn by the user, the two controllable dimming assemblies are positioned in front of/in alignment with the two eyes of the user, respectively, in a manner similar to that of a pair of eyepieces. In other embodiments, a single, relatively wide controllable dimming assembly may be physically coupled to the frame such that, when the frame is worn by the user, the controllable dimming assembly is positioned in front of both of the user's eyes in a manner similar to that of a visor, face mask, or shield.

Figure 12A:
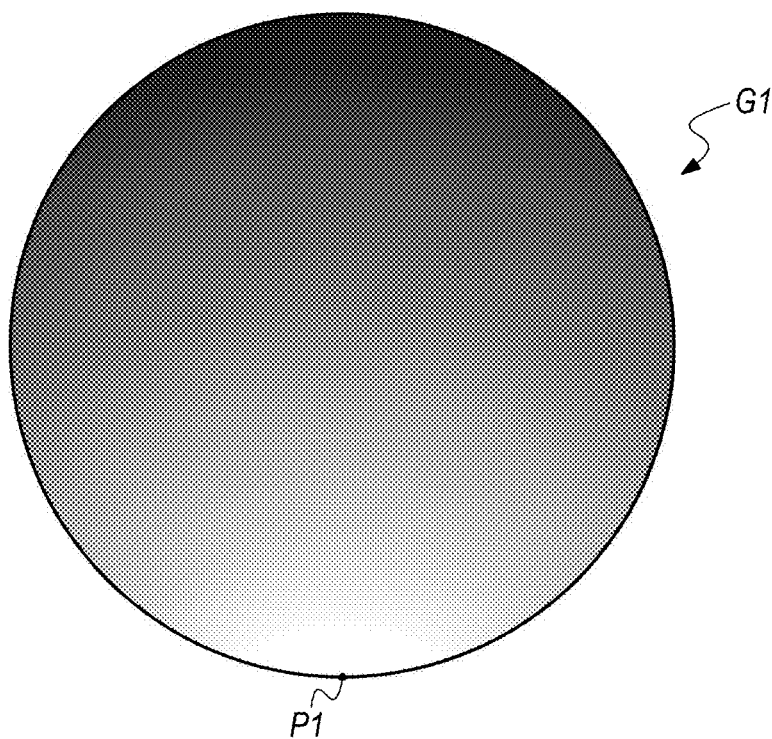
FIGS. 12A to 12D illustrate various dimming patterns, according to some embodiments of the present disclosure.
Figure 12B:
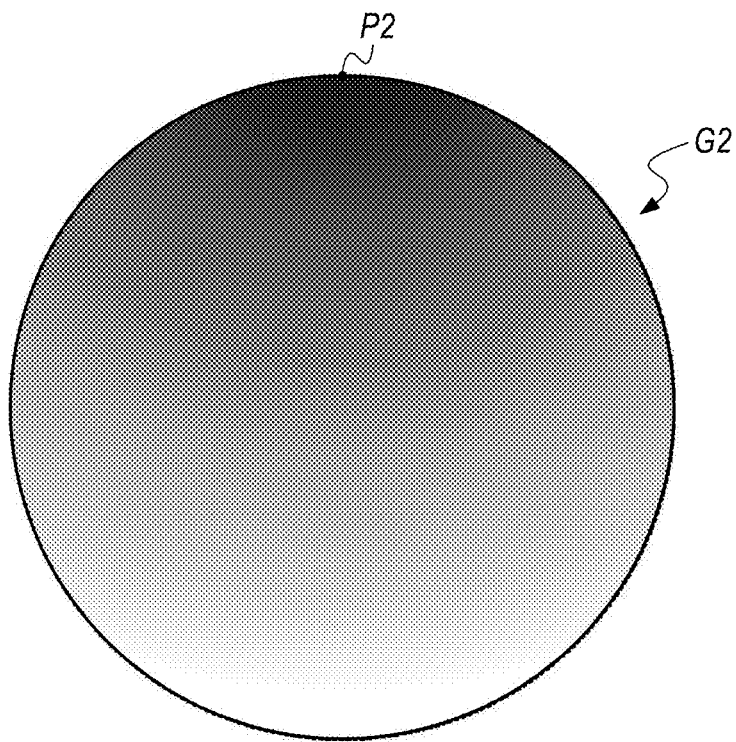
Figure 12C:
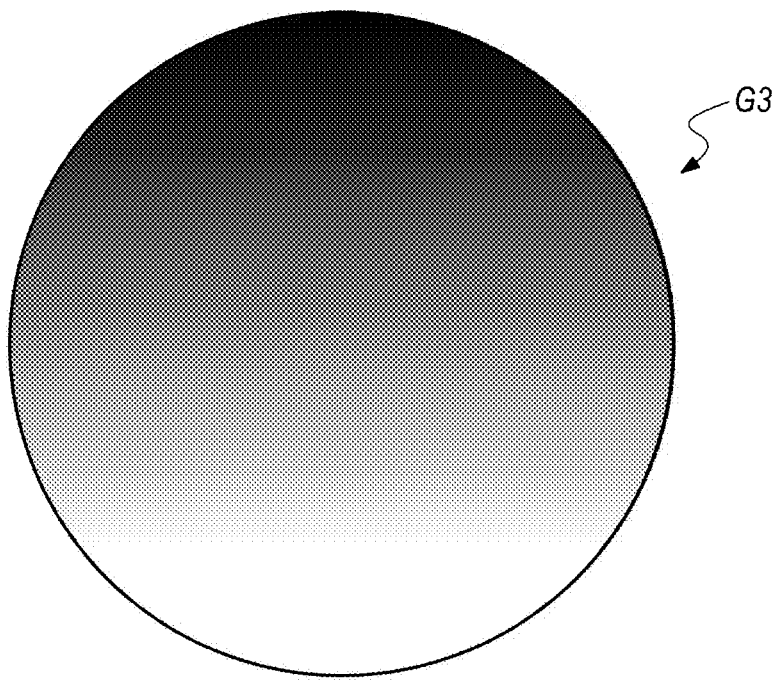
Figure 12D:
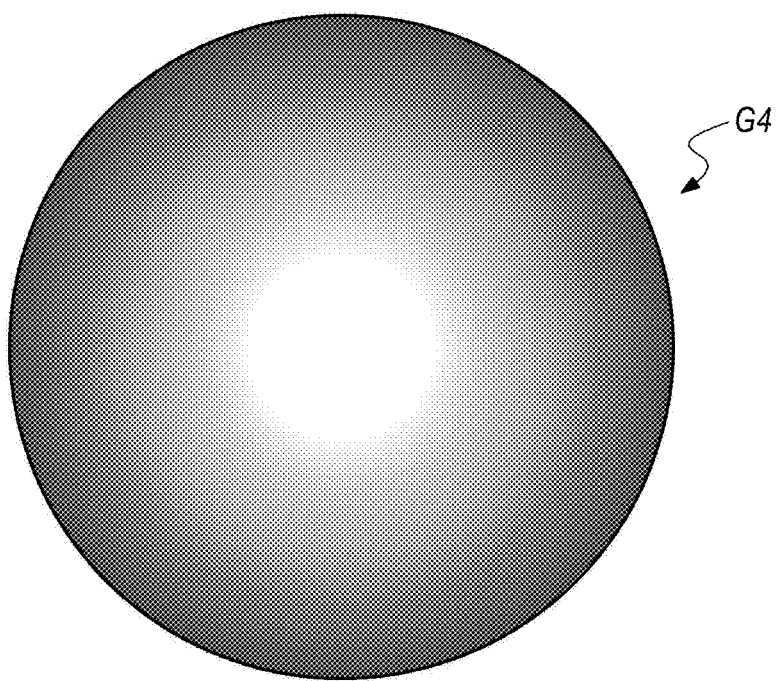

FIGS. 12A-12D show exemplary dimming patterns, according to some embodiments of the present disclosure. FIG. 12A shows a radial gradient dimming pattern G1 in which opacity/transparency varies as a function of Euclidean distance from a corresponding point P1. More specifically, radial gradient dimming pattern G1 exhibits little-to-no opacity at point P1, and exhibits an increasing amount of opacity as the Euclidean distance from the point P1 increases. Point P1, as depicted in FIG. 12A, may represent a point in the radial gradient dimming pattern G1 at which a global minimum level of opacity is exhibited. And, it follows that the point in the radial gradient dimming pattern G1 that is located the furthest away from point P1 may represent a point in the dimming pattern G1 at which a global maximum level of opacity is exhibited. FIG. 12B shows a radial gradient dimming pattern G2 in which opacity/transparency varies as a function of Euclidean distance from a corresponding point P2. As shown in FIG. 12B, radial gradient dimming pattern G2 exhibits high levels of opacity at point P2, and exhibits a decreasing amount of opacity as the Euclidean distance from the point P2 increases. Point P2, as depicted in FIG. 12B, may represent a point in the radial gradient dimming pattern G2 at which a global maximum level of opacity is exhibited, while the point in the radial gradient dimming pattern G2 that is located the furthest away from point P2 may represent a point in the dimming pattern G2 at which a global minimum level of opacity is exhibited. FIG. 12C shows a linear gradient dimming pattern G3 in which opacity/transparency varies linearly from one end to another in a manner similar to the gradient tinting pattern of lens 350. Much like dimming patterns G1 and G2, a set of one or more points at one end of the linear gradient dimming pattern G3 may represent points in the dimming pattern G3 at which a global minimum level of opacity is exhibited, while a set of one or more points at another end of the linear gradient dimming pattern G3 may represent points in the dimming pattern G3 at which a global maximum level of opacity is exhibited. FIG. 12D shows a radial gradient dimming pattern G4 in which opacity/transparency varies as a function of Euclidean distance from the center thereof. As shown in FIG. 12D, radial gradient dimming pattern G4 exhibits little-to-no opacity at its center, and exhibits an increasing amount of opacity as the Euclidean distance from the center increases. Much like dimming patterns G1-G3, a set of one or more points at the center of radial gradient dimming pattern G4 may represent points in the dimming pattern G4 at which a global minimum level of opacity is exhibited, while a plurality of points positioned along the outer perimeter of the dimming pattern G4 may represent points in the dimming pattern G4 at which a global maximum level of opacity is exhibited.

In some implementations, the change in opacity as a function of position relative to a set of one or more points in a given dimming pattern at which a global minimum or maximum level of opacity is exhibited may be linear, exponential, logarithmic, or otherwise polynomial in nature. Furthermore, in some examples, all of the gradient vectors that are associated with a given dimming pattern may have the same magnitude and direction. In some embodiments, such as those in which a radial gradient dimming pattern is employed, the gradient vectors that are associated with a given dimming pattern may not all have the same direction. In some implementations, the system to which the controllable dimming assembly of FIG. 11 belongs may adjust the global level of opacity of a dimming pattern over time by making adjustments to one or both of the global minimum and maximum levels of opacity. As mentioned above, in some examples, adjustments to the global level of opacity may be made on the basis of any of a variety of different factors, some of which are described in further detail below.

FIGS. 13A-13D illustrate exemplary polarizers configured to create dimming patterns, according to some embodiments of the present disclosure. In some implementations, one or more of the exemplary polarizers of FIGS. 13A-13D may be implemented in a controllable dimming assembly in a manner similar to that of outer and/or inner polarizers 1102A, 1102B as described above with reference to FIG. 11. In some examples, each of the exemplary polarizers illustrated in FIGS. 13A-13D may include one or more linear wire-grid polarizer components. Alternatively or additionally, in some implementations, each of the exemplary polarizers illustrated in FIGS. 13A-13D may include a plurality of thin-film micropolarizer components. Furthermore, each of the exemplary polarizers illustrated in FIGS. 13A-13D may include multiple distinct polarizer regions/sections R1-R4, each of which is configured to impart a different polarization state to ambient light propagating therethrough. For example, ambient light that propagates through distinct polarizer region/section R1 of a given exemplary polarizer of a controllable dimming system may be subsequently subject to little-to-no attenuation, while ambient light that propagates through distinct polarizer region/section R4 of such an exemplary polarizer may be subsequently subject to a relatively large amount of attenuation (e.g., 10 degrees or 45 degrees). In this example, the extent to which ambient light that passes through distinct polarizer region/section R2 may be attenuated is greater than that which passes through distinct polarizer region/section R1 and less than that which passes through distinct polarizer region/section R4. It follows that, in this example, the extent to which ambient light that passes through distinct polarizer region/section R3 may be attenuated is greater than that which passes through distinct polarizer region/section R2 and less than that which passes through distinct polarizer region/section R4.

Figure 13A:
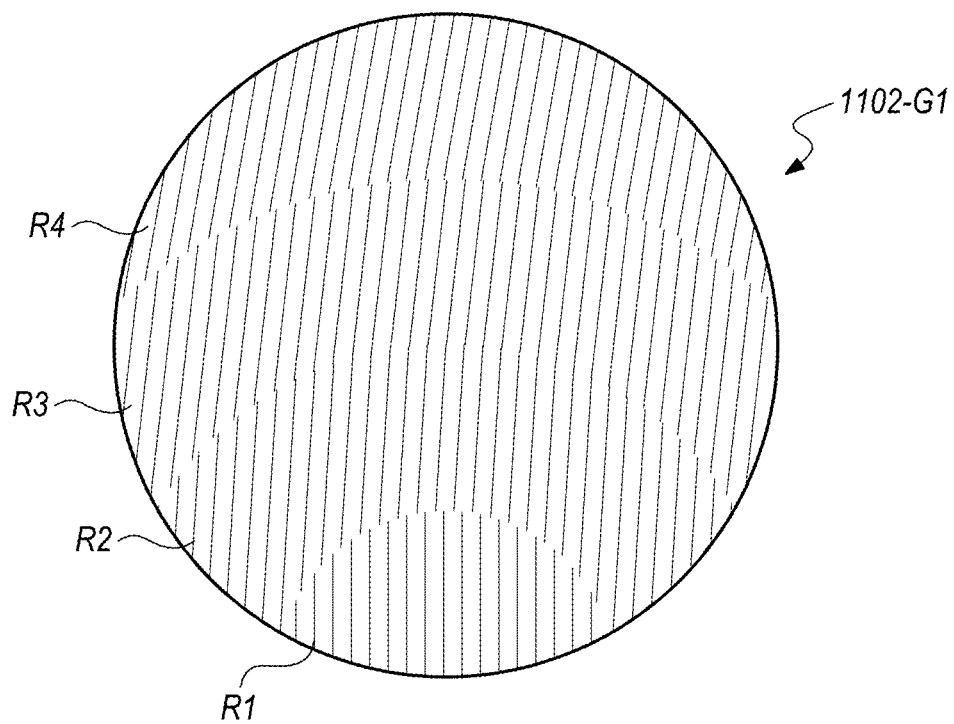
FIGS. 13A to 13D are front views of various polarizers configured to create dimming patterns, according to some embodiments of the present disclosure.
Figure 13B:
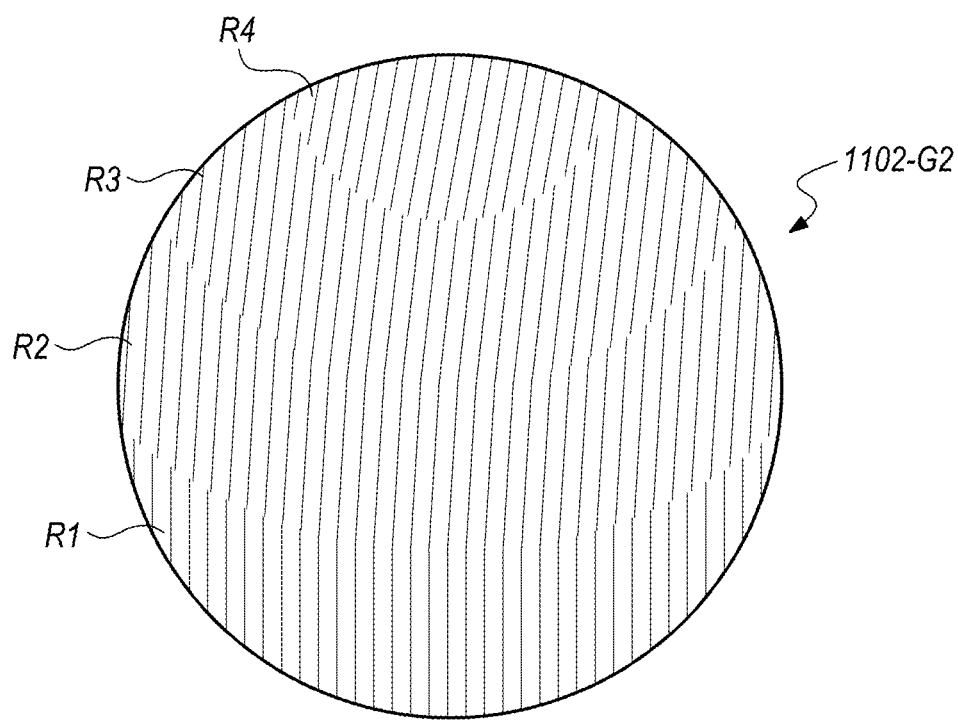
Figure 13C:
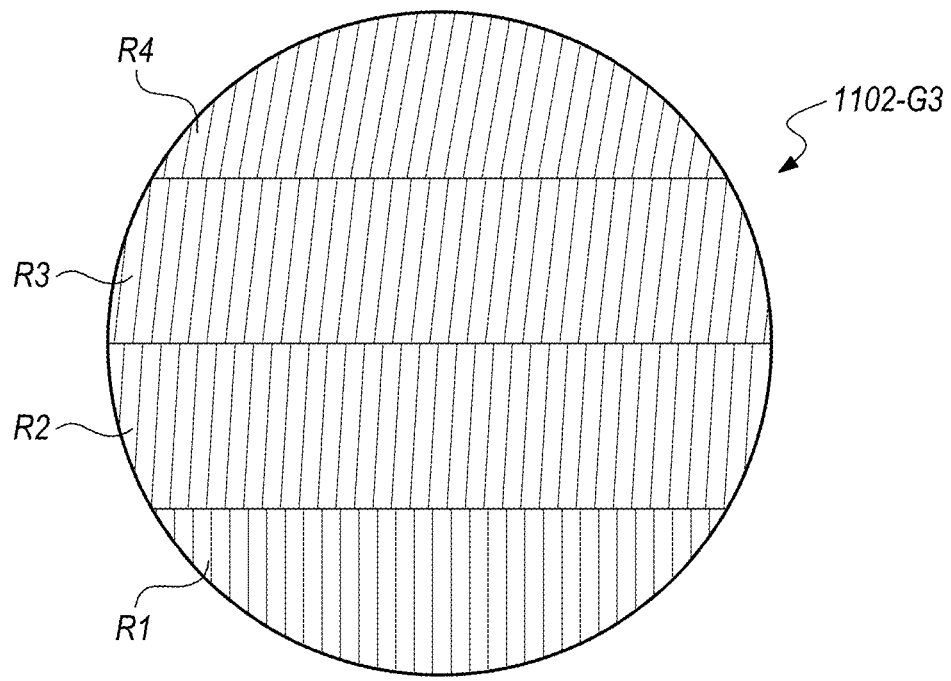
Figure 13D:
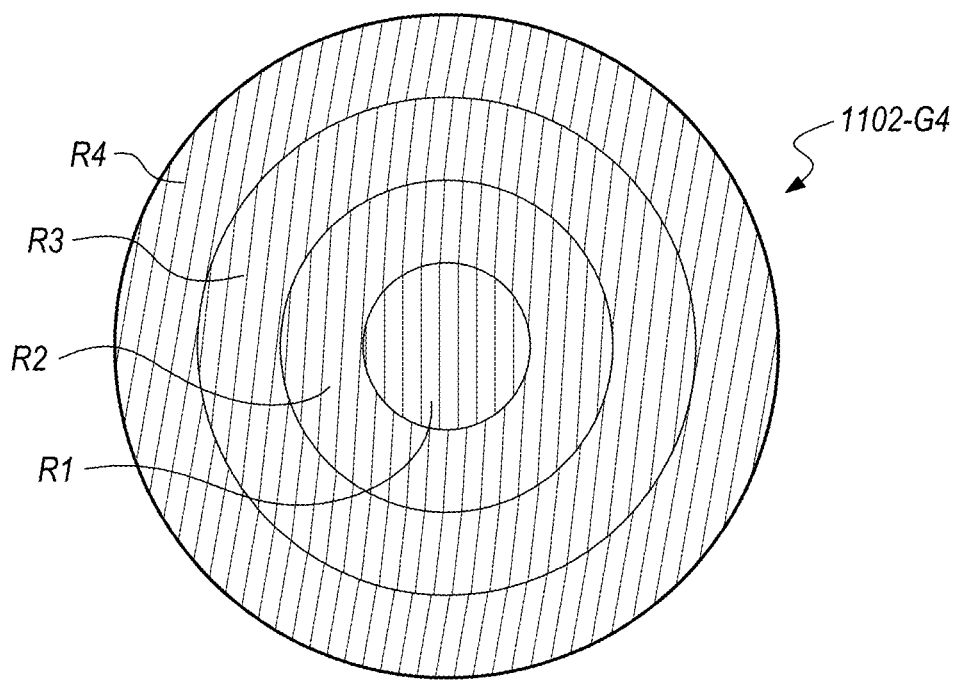

FIG. 13A illustrates an exemplary polarizer 1102-G1 of a controllable dimming system configured to polarize ambient light passing therethrough in a manner such that the controllable dimming assembly attenuates the ambient light in accordance with radial gradient dimming pattern G1 of FIG. 12A. FIG. 13B illustrates an exemplary polarizer 1102-G2 of a controllable dimming system configured to polarize ambient light passing therethrough in a manner such that the controllable dimming assembly attenuates the ambient light in accordance with radial gradient dimming pattern G2 of FIG. 12B. FIG. 13C illustrates an exemplary polarizer 1102-G3 of a controllable dimming system configured to polarize ambient light passing therethrough in a manner such that the controllable dimming assembly attenuates the ambient light in accordance with linear gradient dimming pattern G3 of FIG. 12C. FIG. 13D illustrates an exemplary polarizer 1102-G4 of a controllable dimming system configured to polarize ambient light passing therethrough in a manner such that the controllable dimming assembly attenuates the ambient light in accordance with radial gradient dimming pattern G4 of FIG. 12D.

As mentioned above, in some embodiments, the controllable dimming assembly may include at least one compensation film layer (e.g., one or both of outer and inner compensation film layers 1104A, 1104B) configured to interact with ambient light passing therethrough in a manner varying on the basis of the angle at which the ambient light impinges thereon. Examples of components that may serve as or be included as part of the at least one compensation film layer include one or more coatings, such as coating 320 described above, and/or one or more retardation films or other optical compensation films that are configurable to interact with light impinging thereon in a manner similar to that of coating 320 described above, such as uniaxial retardation films (e.g., polycarbonate resin films, such as PureAce®, etc.), biaxial retardation films (e.g., Tri-acetyl Cellulose ("TAC") films, Cyclo Olefin Polymers ("COP") films, etc.), and liquid crystal films (e.g., wide-view ("WV") films, twisted nematic films, hybrid nematic films, homeotropic films, etc.), and the like. In implementations in which the at least one compensation film includes one or more retardation films or other optical compensation films, such films may be tuned or otherwise fabricated using any of a variety of techniques (e.g., directional "stretching" and/or "rubbing" processes, etc.) such that the controllable dimming system is configured to attenuate a relatively large amount of oblique ambient light with a high AOI and attenuate a relatively small amount of ambient light with lower AOI. Additional examples of materials, configurations, techniques, and operational principles that may be leveraged in the implementing the abovementioned at least one compensation film layer are provided in U.S. Utility patent application Ser. No. 15/479,700, the entirety of which is incorporated herein by reference.

As mentioned above, in some embodiments, the controllable dimming assembly may include at least one compensation film layer (e.g., one or both of outer and inner compensation film layers 1104A, 1104B) configured to interact with ambient light passing therethrough in a manner varying on the basis of the location at which the ambient light impinges thereon. Examples of components that may serve as or be included as part of the at least one compensation film layer in such embodiments may include retarders and waveplates that are spatially-varying or otherwise patterned in a manner similar to that of one or more of the exemplary polarizers described herein with reference to FIGS. 13A-13D. In other words, such components may comprise distinct sections/regions that are each configured to retard or rotate light passing therethrough in a different manner. For example, such components may be configured to retard or rotate ambient light incident an upper portion/section thereof (analogous to section/region R4 in FIGS. 13A-13D) by a particular amount, but polarize/rotate/retard ambient light incident other, lower portions/sections thereof (analogous to one or more of sections/regions R1, R2, and R3 in FIGS. 13A-13D) by other, lesser amounts. In some implementations, such components may include one or more liquid crystal layers be tuned or otherwise fabricated using any of a variety of techniques, such as one or more of those described in U.S. Utility patent application Ser. No. 15/815, 449 and/or U.S. Utility patent application Ser. No. 15/795, 067, both of which are incorporated by reference herein in their entirety.

Figure 14C:
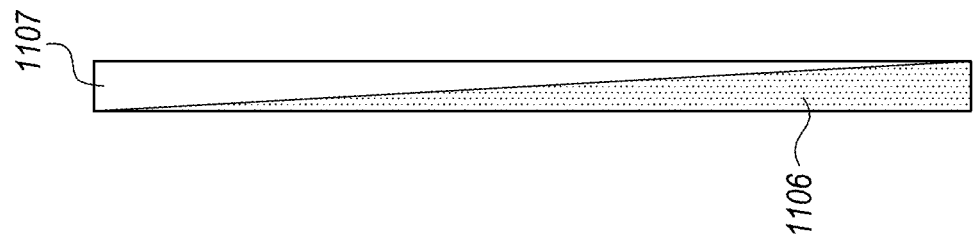
FIGS. 14A-14C are schematic side views of electrode assemblies configured to create dimming patterns, according to some embodiments of the present disclosure.
Figure 14B:
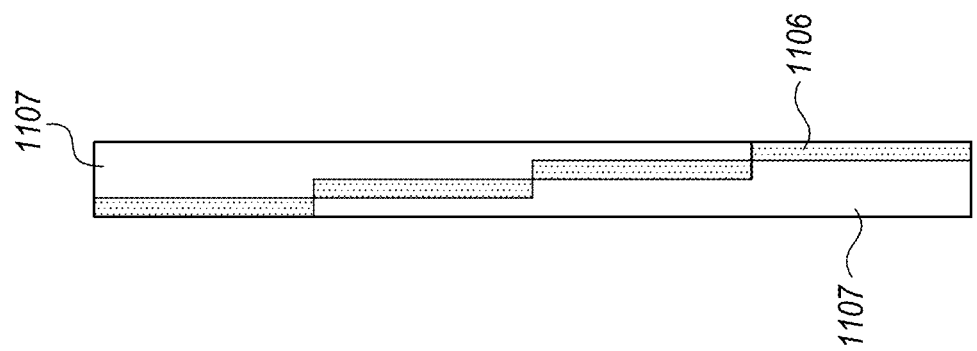
Figure 14A:
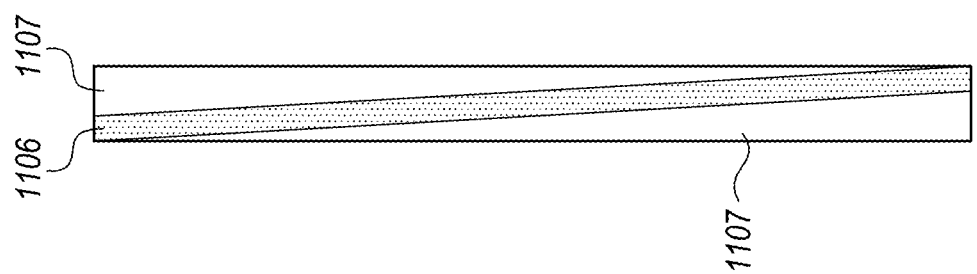

FIGS. 14A-14C illustrate exemplary electrode assemblies configured to create dimming patterns, according to some embodiments of the present disclosure. In some implementations, one or more of the exemplary electrode assemblies of FIGS. 14A-14C may be implemented in a controllable dimming assembly in a manner similar to that of outer and/or inner electrodes 1106A, 1106B as described above with reference to FIG. 11. More specifically, FIGS. 14A-14C illustrate exemplary electrode assemblies that each include at least one electrode component 1106 embedded in and/or disposed on substrate material 1107. In some examples, the at least one electrode component 1106 illustrated in one or more of the exemplary electrode assemblies of FIGS. 14A-14C may be a transparent conducting film, such as an indium tin oxide ("ITO") film. Each exemplary electrode assembly may be implemented in a controllable dimming assembly in a manner similar to that of inner or outer electrodes 1106A, 1106B as described above with reference to FIG. 11. As such, each exemplary electrode assembly may be positioned parallel to another electrode assembly while the electrode component 1106 is not necessarily parallel to the another electrode. In some examples, such another electrode assembly may include a single planar layer of ITO or other transparent conducting film. A layer of liquid crystal molecules similar to liquid crystal layer 1108 as described above with reference to FIG. 11 may be disposed between each pair of electrode assemblies.

FIG. 14A illustrates an exemplary electrode assembly comprising a tilted planar electrode component 1106. The exemplary electrode assembly of FIG. 14A may, for example, be implemented in a controllable dimming assembly parallel to another electrode assembly include a single planar layer of ITO. That is, the surface of substrate material 1107 may be positioned parallel to a surface of the single planar layer of ITO in the other electrode assembly. In this way, the surface of electrode component 1106 of the exemplary electrode assembly of FIG. 14A may be tilted or otherwise non-parallel to the surface of the single planar layer of ITO in the other electrode assembly, while the exemplary electrode assembly and the other electrode assembly may be stacked in parallel (e.g., on either side of a liquid crystal layer). As such, the distance between the surface of electrode component 1106 of the exemplary electrode assembly of FIG. 14A and the surface of the single planar layer of ITO in the other electrode assembly may be non-uniform. In this way, in operation, a non-uniform electric field may be produced between the exemplary electrode assembly of FIG. 14A and the other electrode assembly. The non-uniform electric field may result in non-uniform polarization by the liquid crystal layer, which in turn may result in non-uniform or graded attenuation of light passing therethrough. Because the distance between the surface of electrode component 1106 of the electrode assembly in FIG. 14A and the other electrode assembly increases from the bottom to the top of the electrode assembly, the electric field and the resulting polarization are both stronger at the top of the electrode assembly, and the light attenuation is greater at the top of the liquid crystal layer compared to the bottom.

FIG. 14B illustrates an exemplary electrode assembly comprising a plurality of planar electrode components/segments 1106 each positioned a different distance from a planar surface thereof. The exemplary electrode assembly of FIG. 14B may, for example, be implemented in a controllable dimming assembly parallel to another electrode assembly include a single planar layer of ITO. Much like the exemplary electrode assembly of FIG. 14A, the surface of substrate material 1107 in the exemplary electrode assembly of FIG. 14B may be positioned parallel to a surface of a single planar layer of ITO in another electrode assembly. Due to the relative positions of the planar electrode components/segments 1106 to each other, the distance between the surface of each planar electrode component/segment 1106 in the electrode assembly of FIG. 14B and the surface of the single planar layer of ITO in another electrode assembly varies. That is, the distance increases from the bottom to the top of the electrode assembly. As such, in operation, a non-uniform (i.e., increasing from bottom to top) electric field may be produced between the exemplary electrode assembly of FIG. 14B and the other electrode assembly. As described above, the increasing electric field results in greater light attenuation at the top of the liquid crystal layer compared to the bottom.

FIG. 14C illustrates an exemplary electrode assembly comprising an electrode component 1106 with (1) a surface that tilts away from or is otherwise nonparallel to a surface of the substrate material 1107 and (2) a thickness that decreases from bottom to top of the electrode assembly. The exemplary electrode assembly of FIG. 14C may, for example, be implemented in a controllable dimming assembly parallel to another electrode assembly include a single planar layer of ITO. Much like the exemplary electrode assemblies of FIGS. 14A and 14B, the surface of substrate material 1107 in the exemplary electrode assembly of FIG. 14C may be positioned parallel to a surface of a single planar layer of ITO in another electrode assembly. The distance between one surface of the electrode component 1106 in the electrode assembly of FIG. 14C and the surface of the single planar layer of ITO in another electrode assembly varies. That is, the distance increases from the bottom to the top of the electrode assembly. In addition, the thickness of the electrode component 1106 decreases from the bottom to the top of the electrode assembly. Because the resistance of a given electrical conductor is inversely proportional to the cross-sectional area of the conductor, it follows that the resistance of the electrode component 1106 may vary from the bottom to the top of the electrode assembly by virtue of the variation in thickness of the electrode component 1106. Such features of the electrode component 1106 depicted in FIG. 14C produce, when in operation, a non-uniform (i.e., increasing from bottom to top) electric field between the exemplary electrode assembly of FIG. 14C and the other electrode assembly. As described above, the increasing electric field results in greater light attenuation at the top of the liquid crystal layer compared to the bottom.

Figure 15:
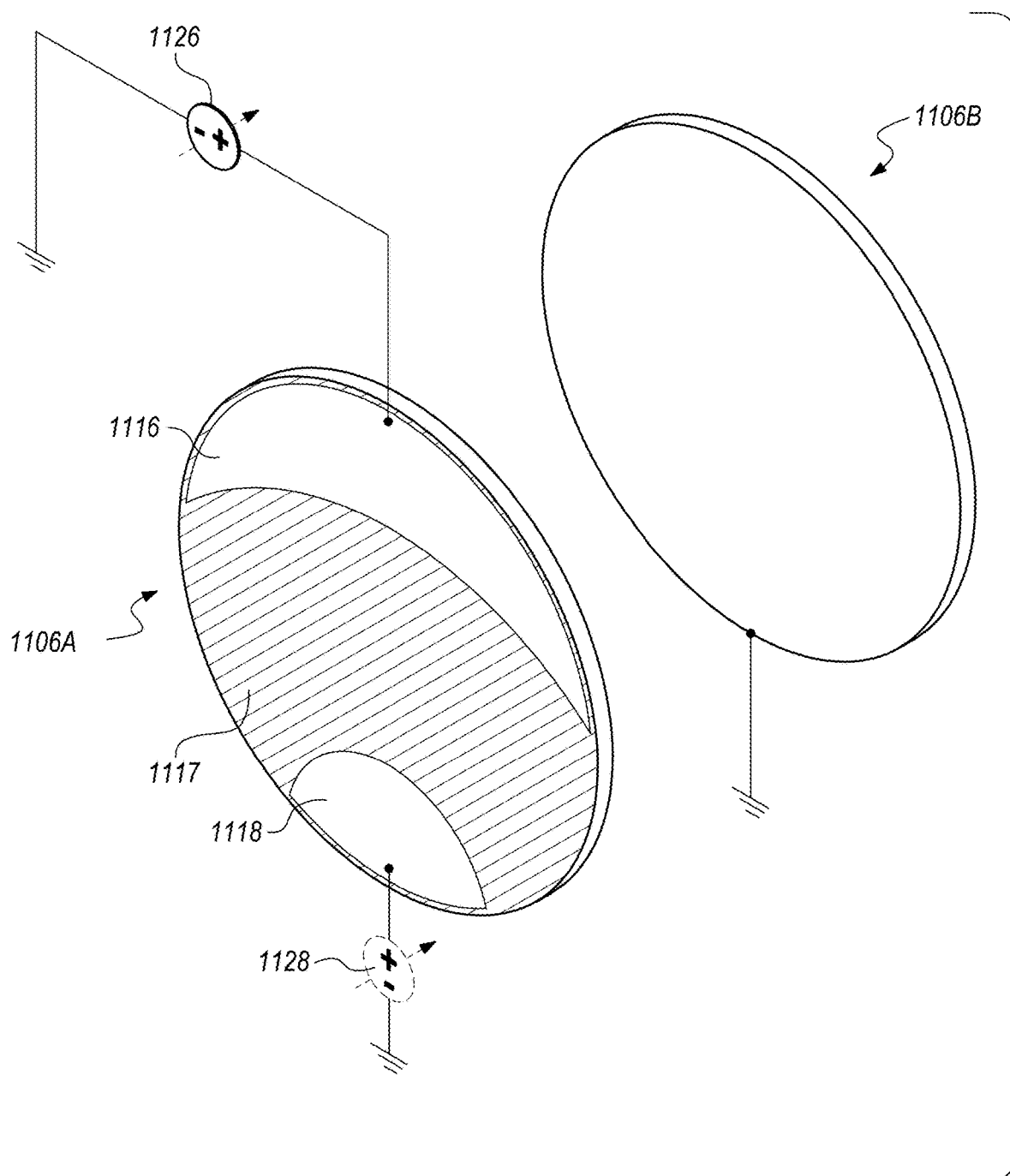
FIG. 15 is a schematic perspective view of an electrode assembly configured to create dimming patterns, according to some embodiments of the present disclosure.

FIG. 15 illustrates an exemplary electrode assembly comprising a non-uniform, multi-sectional, planar first electrode 1106A and a uniform planar second electrode 1106B, according to some embodiments of the present disclosure. In some implementations, the exemplary electrode assembly of FIG. 15 may be implemented in a controllable dimming assembly in a manner similar to that of outer and inner electrodes 1106A, 1106B as described above with reference to FIG. 11. The uniform planar second electrode 1106B may include a single planar layer of ITO. The first and second electrodes 1106A, 1106B may be parallel to each other and disposed on either side of a liquid crystal layer. The first electrode 1106A may include three sections/portions 1116, 1117, 1118 disposed adjacent each other on a surface of the first electrode 1106A. The first section 1116 is disposed at the top of the first electrode 1106A, the third section 1118 is disposed at the bottom of the first electrode 1106A, and the second section 1117 is disposed between the first and third sections 1116, 1118. The first and third sections 1116, 1118 may be formed from a relatively more conductive transparent material such as a layer of ITO or other transparent conducting oxide ("TCO"), and the intervening second section 1117 may be formed from a relatively less conductive transparent material such as a layer include or including graphene, graphene oxide, and/or carbon nanotubes ("CNT"). The exemplary electrode assembly also includes a first voltage source 1126 electrically coupled to the first section 1116 and a ground electrode electrically coupled to the second electrode 1106B. The exemplary electrode assembly also includes an optional second voltage source 1128 electrically coupled to the third section 1118.

In operation, when first and second voltages are applied (via the first and second voltage sources 1126, 1128) to the first electrode 1106A, a non-uniform electric field is generated between the first and second electrodes 1106A, 1106B. In particular, when a stronger voltage by applied to the first voltage source 1126 and a weaker voltage is applied by the second voltage source 1128, a non-uniform electric field is generated that approximately increases from the bottom to the top of the first electrode 1106A. In embodiments without the second voltage source 1128, applying voltage to the first voltage source may generate a similar non-uniform electric field. The non-uniform electric fields may result in non-uniform polarization by the liquid crystal layer, which in turn may result in non-uniform or graded attenuation of light passing therethrough. Because the non-uniform electric fields approximately increase from the bottom to the top of the first electrode 1106A, the electric field and the resulting polarization are both stronger at the top of the electrode assembly, and the light attenuation is greater at the top of the liquid crystal layer compared to the bottom. In some embodiments, one or more of the exemplary electrode assemblies described herein with reference to FIGS. 15 and 16A-16D may only include sections 1116 and 1117, and not include section 1118. In these embodiments, section 1117 may be directly electrically coupled to the corresponding circuit.

Figure 16A:
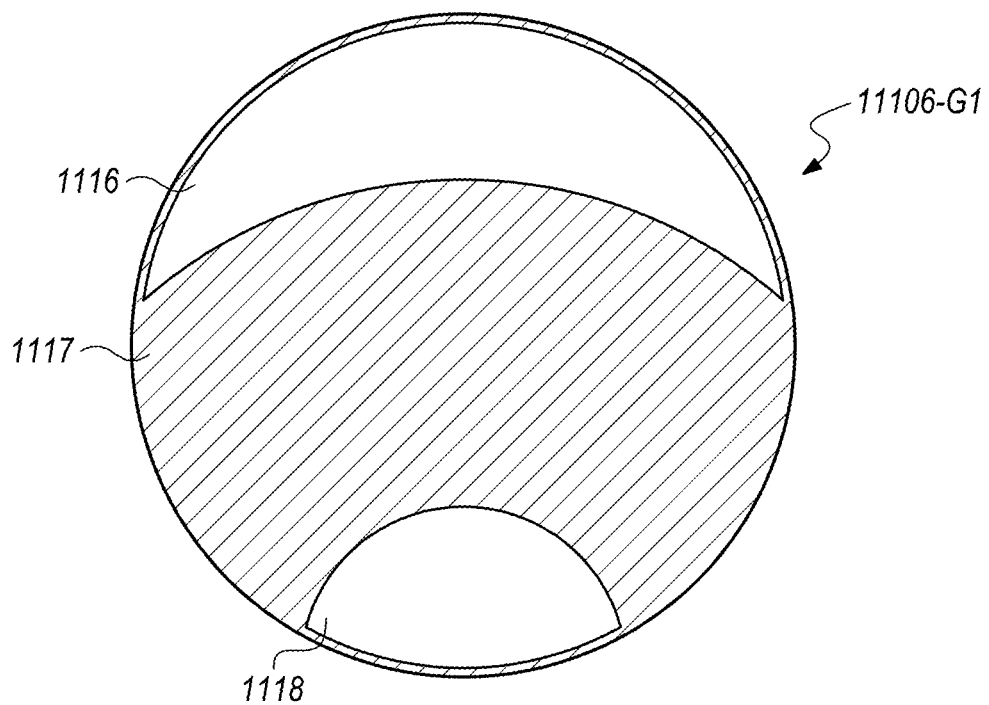
FIGS. 16A to 16D are front views of various electrode assemblies configured to create dimming patterns, according to some embodiments of the present disclosure.
Figure 16B:
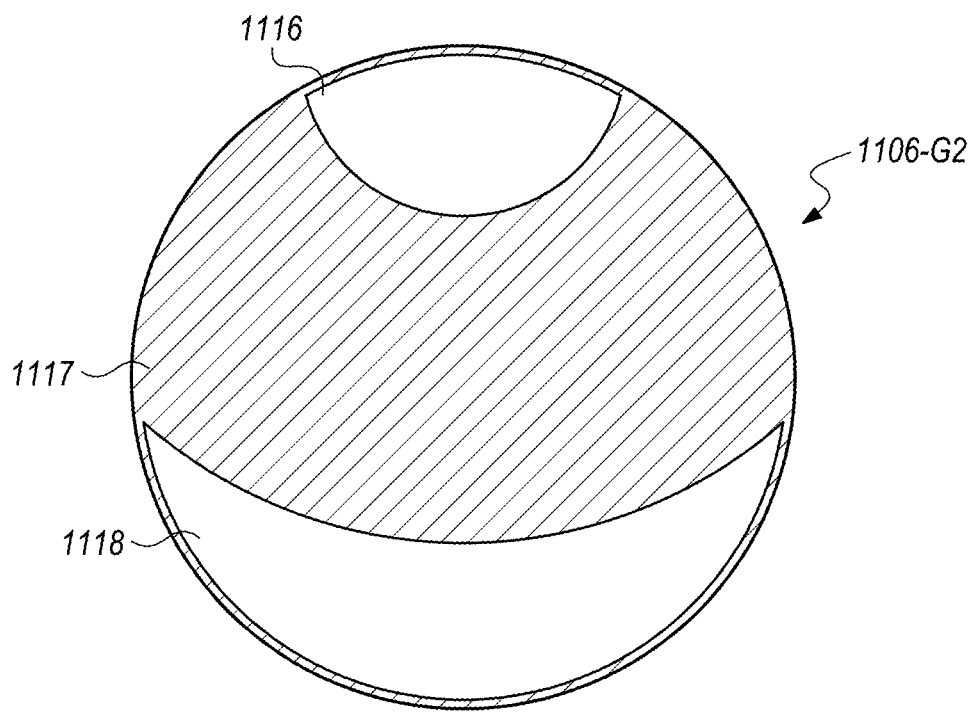
Figure 16C:
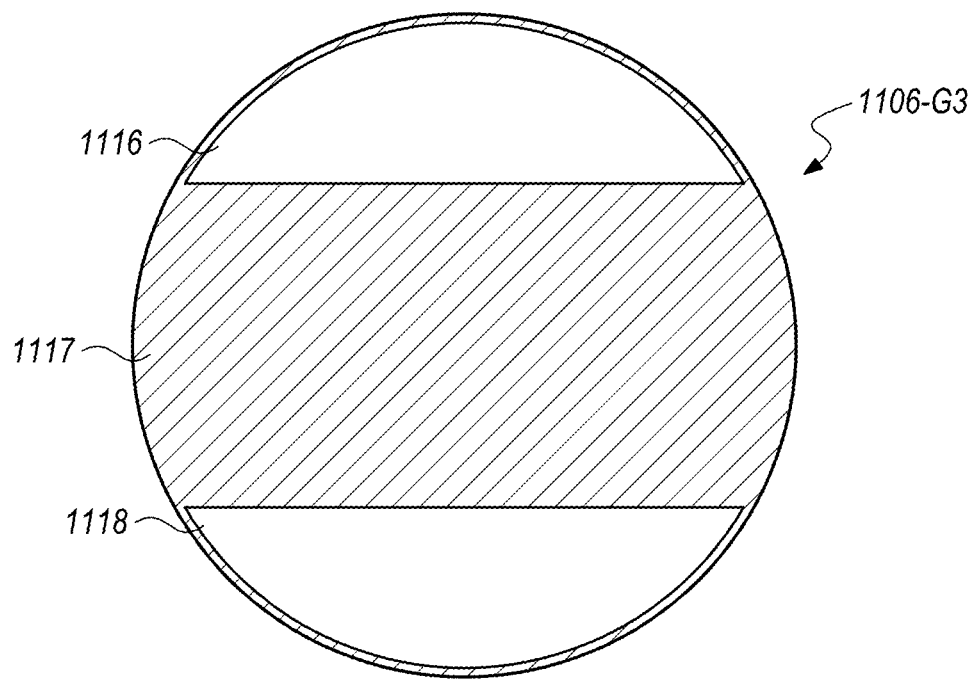
Figure 16D:
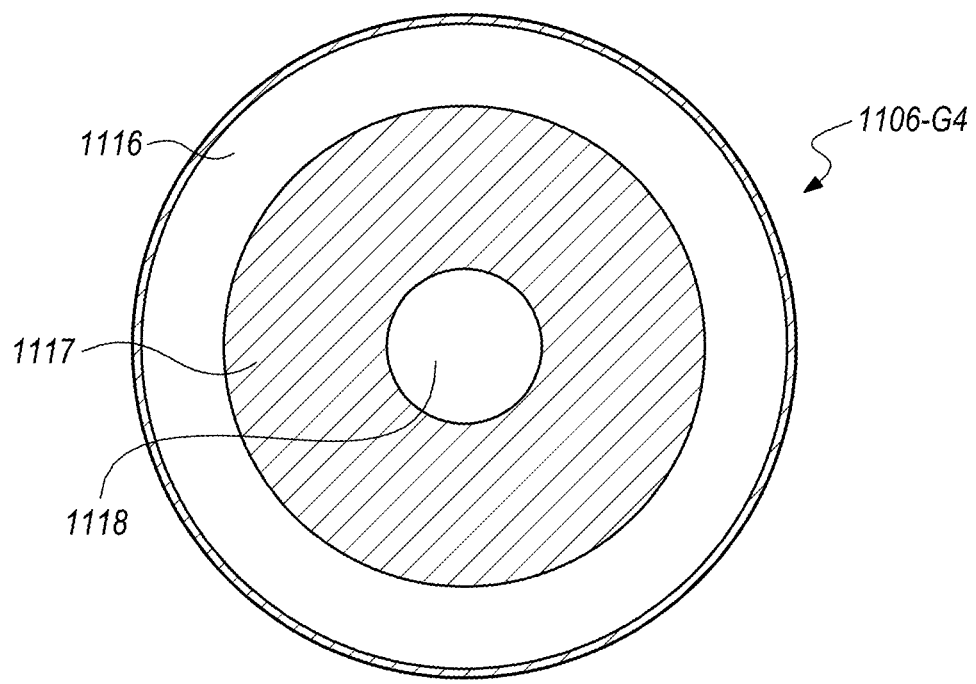

FIG. 16A illustrates an exemplary first electrode 1106-G1 of a controllable dimming system configured to polarize ambient light passing therethrough in a manner such that the controllable dimming assembly attenuates the ambient light in accordance with radial gradient dimming pattern G1 of FIG. 12A. The exemplary first electrode 1106-G1 has three sections/portions 1116, 1117, 1118 disposed and shaped similarly to the first electrode 1106A depicted in FIG. 15. FIG. 16B illustrates an exemplary first electrode 1106-G2 of a controllable dimming system configured to polarize ambient light passing therethrough in a manner such that the controllable dimming assembly attenuates the ambient light in accordance with radial gradient dimming pattern G2 of FIG. 12B. The exemplary first electrode 1106-G2 has three sections/portions 1116, 1117, 1118 like the first electrode 1106A depicted in FIG. 15, however the three sections/portions 1116, 1117, 1118 are shaped differently from the corresponding sections in the first electrode 1106A depicted in FIG. 15. FIG. 16C illustrates an exemplary first electrode 1106-G3 of a controllable dimming system configured to polarize ambient light passing therethrough in a manner such that the controllable dimming assembly attenuates the ambient light in accordance with linear gradient dimming pattern G3 of FIG. 12C. The exemplary first electrode 1106-G3 has three sections/portions 1116, 1117, 1118 like the first electrode 1106A depicted in FIG. 15, however the three sections/portions 1116, 1117, 1118 are shaped differently from the corresponding sections in the first electrode 1106A depicted in FIG. 15. FIG. 16D illustrates an exemplary first electrode 1106-G4 of a controllable dimming system configured to polarize ambient light passing therethrough in a manner such that the controllable dimming assembly attenuates the ambient light in accordance with radial gradient dimming pattern G4 of FIG. 12D. The exemplary first electrode 1106-G3 has three sections/portions 1116, 1117, 1118 like the first electrode 1106A depicted in FIG. 15, however the three sections/portions 1116, 1117, 1118 are shaped and disposed differently from the corresponding sections in the first electrode 1106A depicted in FIG. 15.

Figure 17A:
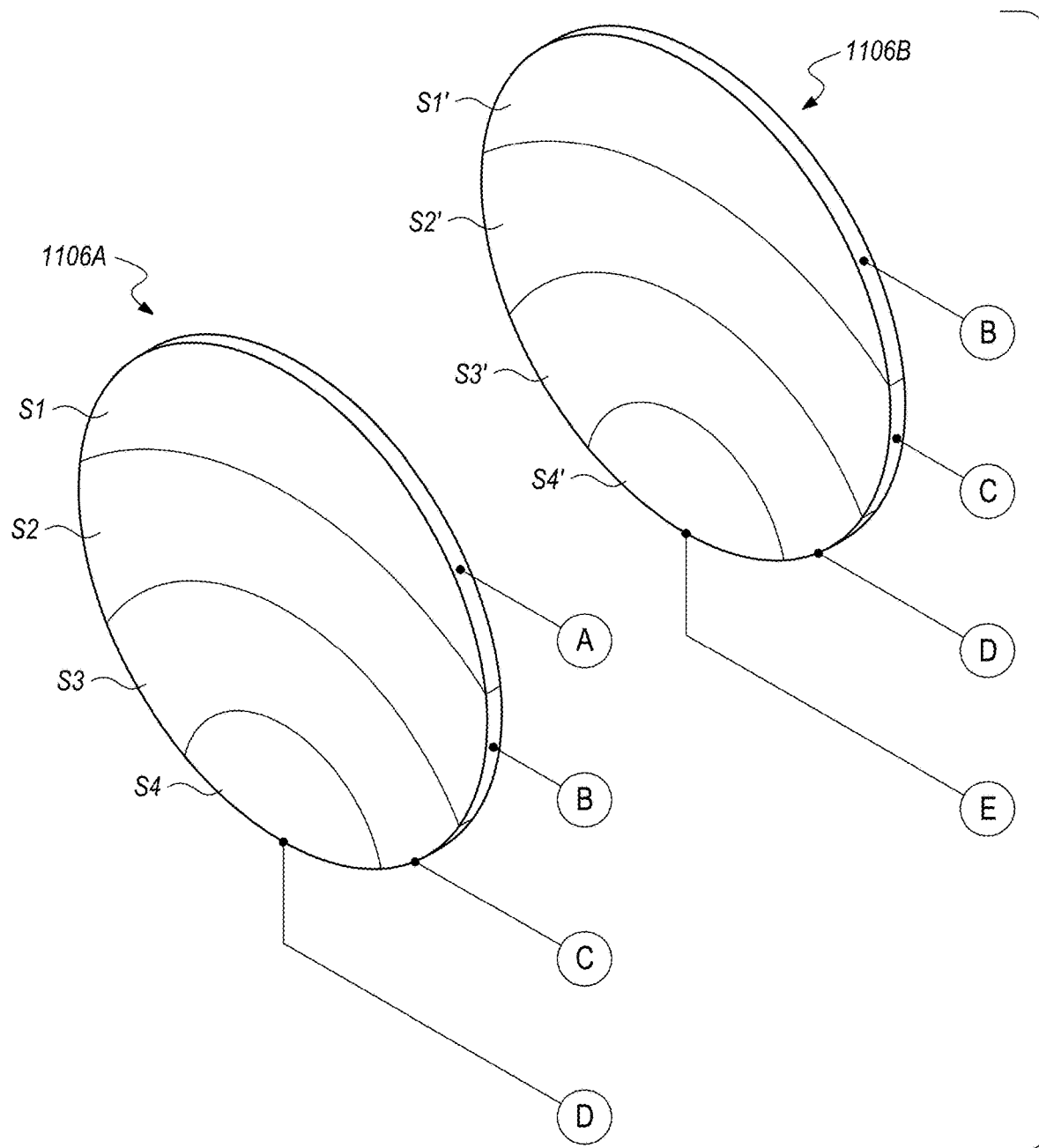
FIG. 17A is a schematic perspective view of an electrode assembly configured to create dimming patterns, according to some embodiments of the present disclosure.
Figure 17B:
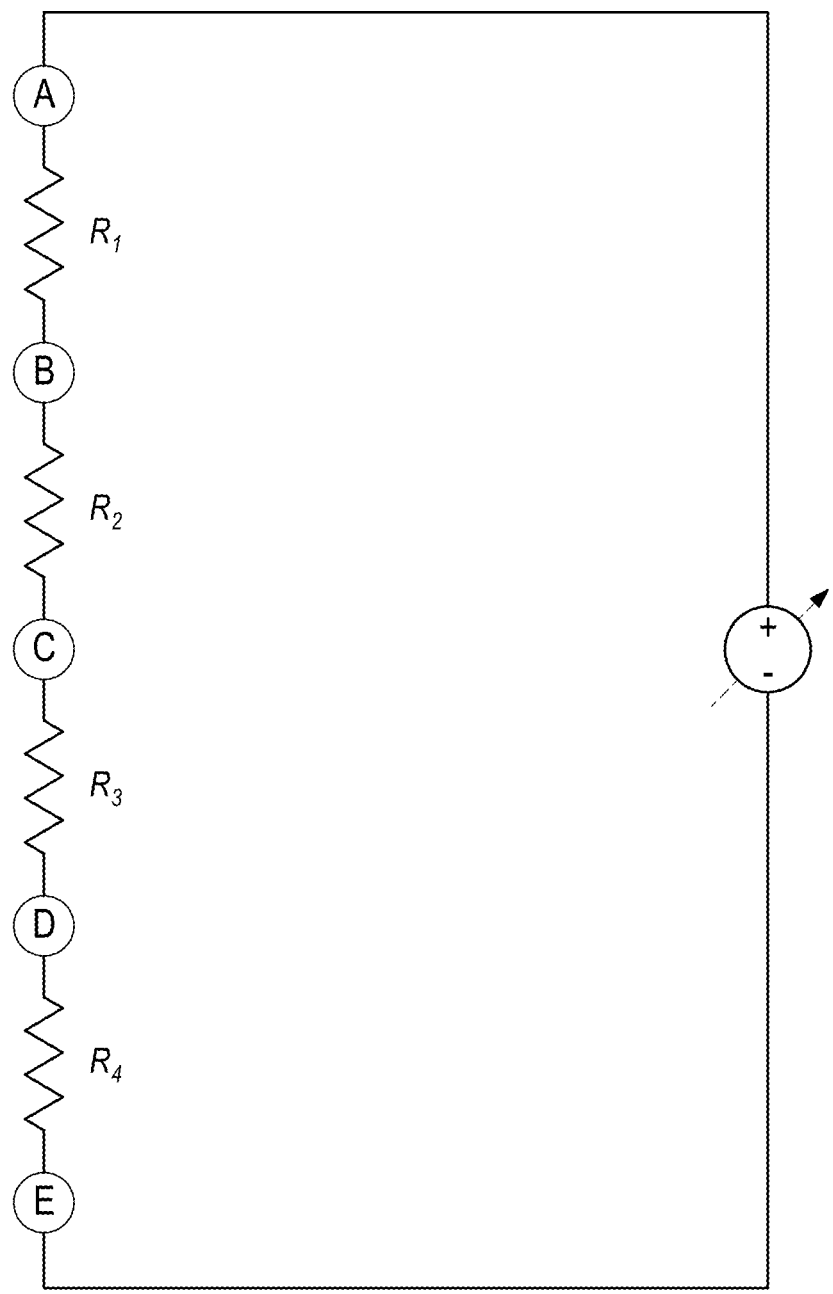
FIG. 17B is a circuit diagram of the electrode assembly depicted in FIG. 17A, according to some embodiments of the present disclosure.

FIG. 17A illustrates an exemplary electrode assembly comprising non-uniform, multi-sectional, planar first and second electrodes 1106A, 1106B, according to some embodiments of the present disclosure. In some implementations, the exemplary electrode assembly of FIG. 17 may be implemented in a controllable dimming assembly in a manner similar to that of outer and inner electrodes 1106A, 1106B as described above with reference to FIG. 11. The first and second electrodes 1106A, 1106B may be parallel to each other and disposed on either side of a liquid crystal layer. The first electrode 1106A may include four sections/portions S1, S2, S3, S4 disposed adjacent to, but electrically insulated from, each other on a surface of the first electrode 1106A. Insulators may be disposed between sections S1 and S2, S2 and S3, and S3 and S4 to insulate the sections S1, S2, S3, S4 from each other. The first section S1 is disposed at the top of the first electrode 1106A, the second section S2 is disposed further down the first electrode 1106A, the third section S3 is disposed still further down the first electrode 1106A, and the fourth section S4 is disposed at the bottom of the first electrode 1106A. The sections S1, S2, S3, S4 may be formed from a relatively more conductive transparent material such as a layer of ITO. The second electrode 1106B may include four sections/portions S1', S2', S3', S4' disposed adjacent to each other on a surface of the second electrode 1106B. The first section S1' is disposed at the top of the second electrode 1106B, the second section S2' is disposed further down the second electrode 1106B, the third section S3' is disposed still further down the second electrode 1106B, and the fourth section S4' is disposed at the bottom of the second electrode 1106B. The sections S1', S2', S3', S4' may be formed from a relatively more conductive transparent material such as a layer of ITO. In some implementations, the exemplary electrode assembly of FIG. 17A may be driven at least in part by a voltage divider network, such as the circuit described below with reference to FIG. 17B, or equivalent circuitry. For example, the sections S1, S2, S3, and S4 may be electrically coupled to the circuit described below with reference to FIG. 17B at points A, B, C, and D, respectively. Similarly, in such examples, the sections S1', S2', S3', and S4' may be electrically coupled to the circuit of FIG. 17B at points B, C, D, and E respectively. In operation, the sections of the first electrode 1106A and the sections of the second electrode 1106B may function as anodes and cathodes, respectively, by virtue of their electrical connections to the circuitry of FIG. 17B. FIG. 17B is a circuit diagram for the exemplary electrode assembly illustrated in FIG. 17A. In particular, FIG. 17B depicts exemplary voltage divider circuitry for driving each of the electrode sections in the exemplary electrode assembly described above with reference to FIG. 17A. It is to be understood that other electrical and/or computational circuits and components may be implemented in place of or in conjunction with the circuitry of FIG. 17B. As shown in FIG. 17B, such voltage divider circuitry may at least include a voltage source electrically coupled to a plurality of resistors in series. In some implementations, the voltage source may be variable, switchable, or otherwise controllable by one or more hardware components electrically coupled thereto, such as processors, power supplies, logic gates, and the like. Each anode-cathode pair present in the exemplary electrode assembly illustrated in FIG. 17A may be electrically coupled in parallel with a different one of the plurality of resistors or a different combination of the plurality of resistors. In the example of FIGS. 17A and 17B, the S1-S1' electrode pair is electrically coupled in parallel with a first resistor R1, the S2-S2' electrode pair is electrically coupled in parallel with a second resistor R2, the S3-S3' electrode pair is electrically coupled in parallel with a third resistor R3, and the S4-S4' electrode pair is electrically coupled in parallel with a fourth resistor R4. Furthermore, in this example, the resistance of the fourth resistor R4 is greater than the resistance of the third resistor R3, which is greater than the resistance of the second resistor R2, which is greater than the resistance of the first resistor R4. In some embodiments, one or more of the plurality of resistors (e.g., R1, R2, R3, R4) may be disposed along an edge of one electrode in the electrode assembly (e.g., the first electrode 1106A). In other embodiments, one or more of the plurality of resistors (e.g., R1, R2, R3, R4) may be disposed on a surface of one electrode in the electrode assembly (e.g., the first electrode 1106A) between respective sections thereof (e.g., S1, S2, S3, S4).

In operation, when a voltage is applied to the first and second electrodes 1106A, 1106B, a non-uniform electric field is generated between the first and second electrodes 1106A, 1106B. In particular, when a voltage is applied by the voltage source to the first section A of the first electrode 1106A, the voltage is reduced with each serially coupled resistor R1, R2, R3, R4, such that an effectively lower voltage is applied to each subsequent section S2, S3, S4 of the first electrode 1106A. As a result, a non-uniform electric field is generated that approximately increases from the bottom to the top of the first electrode 1106A. The non-uniform electric fields may result in non-uniform polarization by the liquid crystal layer, which in turn may result in non-uniform or graded attenuation of light passing therethrough. Because the non-uniform electric fields approximately increase from the bottom to the top of the first electrode 1106A, the electric field and the resulting polarization are both stronger at the top of the electrode assembly, and the light attenuation is greater at the top of the liquid crystal layer compared to the bottom. In some implementations, each of sections S1', S2', and S3' may not be electrically coupled to the circuitry of FIG. 17B at points B, C, and D, respectively, but instead may all be electrically coupled to the circuitry of FIG. 17B at point E in much the same way as section S4'. In this way, every section of the second electrode 1106B may be electrically coupled to common ground, such that each anode-cathode pair present in the exemplary electrode assembly illustrated in FIG. 17A may be electrically coupled in parallel with a different combination of the plurality of resistors. For instance, referring again to the example of FIGS. 17A and 17B, in these implementations, the S1-S1' electrode pair would be electrically coupled in parallel with resistors R1-R4, the S2-S2' electrode pair would be electrically coupled in parallel with resistors R2-R4, the S3-S3' electrode pair is electrically coupled in parallel with resistors R3-R4, and the S4-S4' electrode pair is electrically coupled in parallel with the fourth resistor R4. In such implementations, the quantitative relationship between the values of the plurality of resistors R1-R4 may not necessarily need to conform to that having been described above and depicted in FIG. 17B (i.e., relationship in which R4>R3>R2>R1). For example, in some embodiments, some or all of the plurality of resistors R1-R4 may have substantially equal resistor values. In some examples, one or more of the plurality of resistors may have higher resistive values than one or more resistors serially downstream therefrom.

Figure 18A:
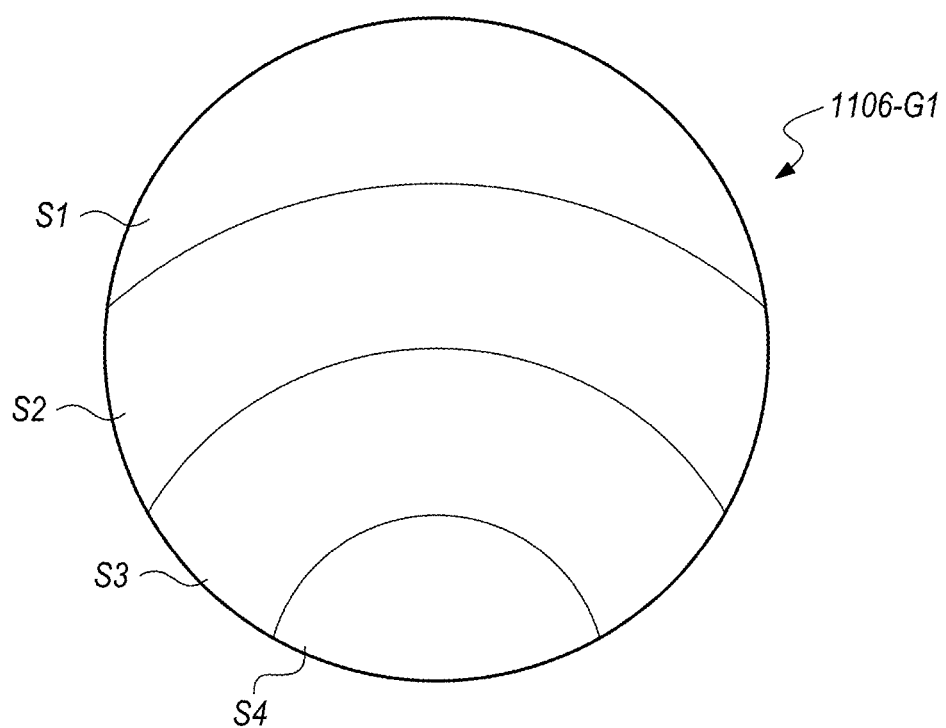
FIGS. 18A to 18D are front views of various electrode assemblies configured to create dimming patterns, according to some embodiments of the present disclosure.
Figure 18B:
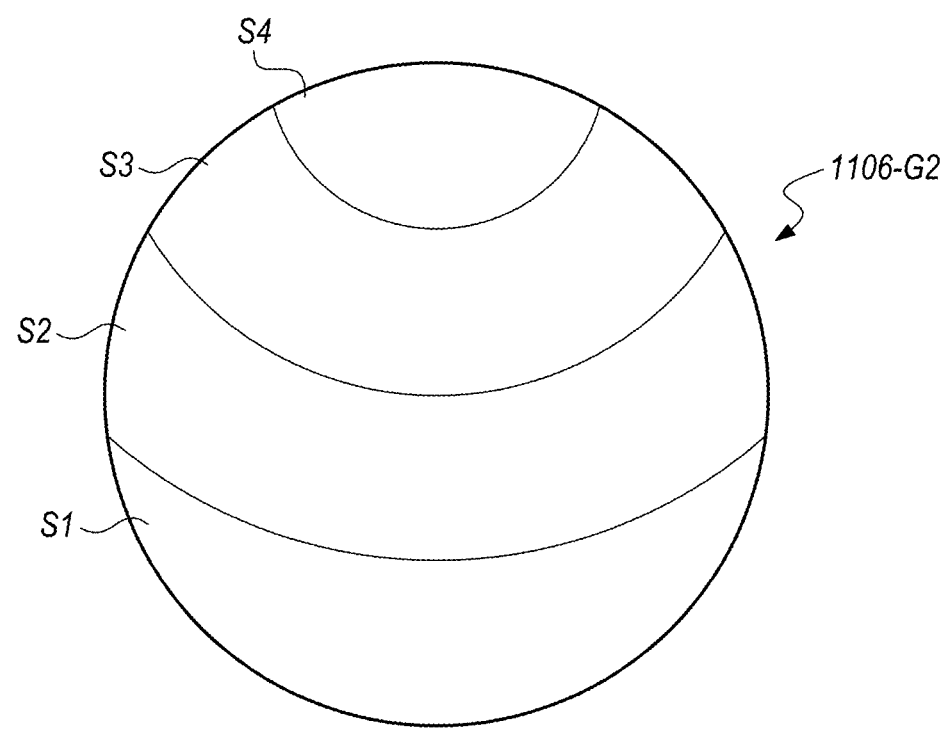
Figure 18C:
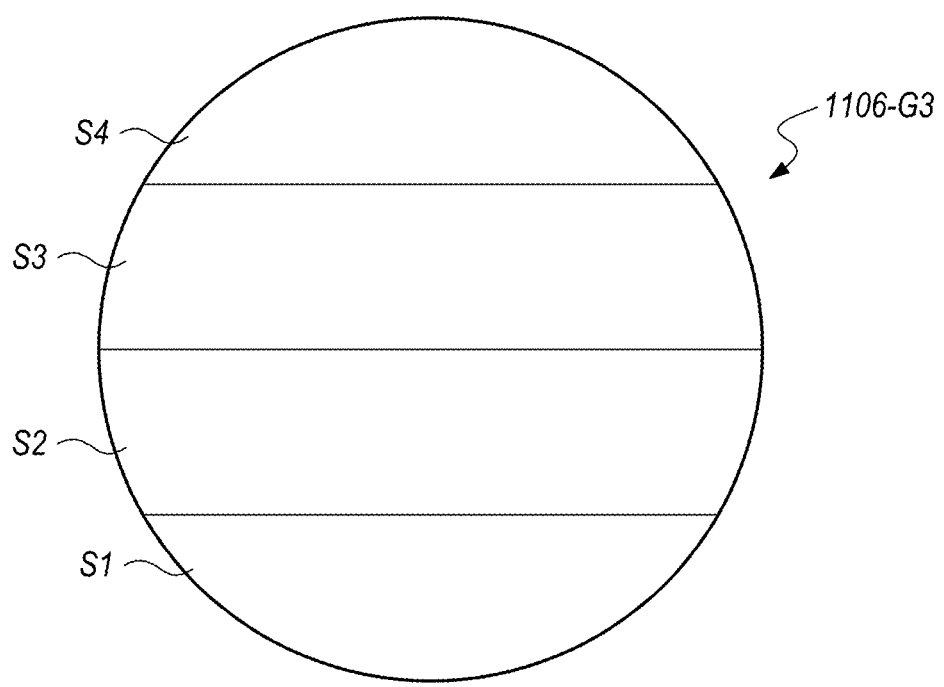
Figure 18D:
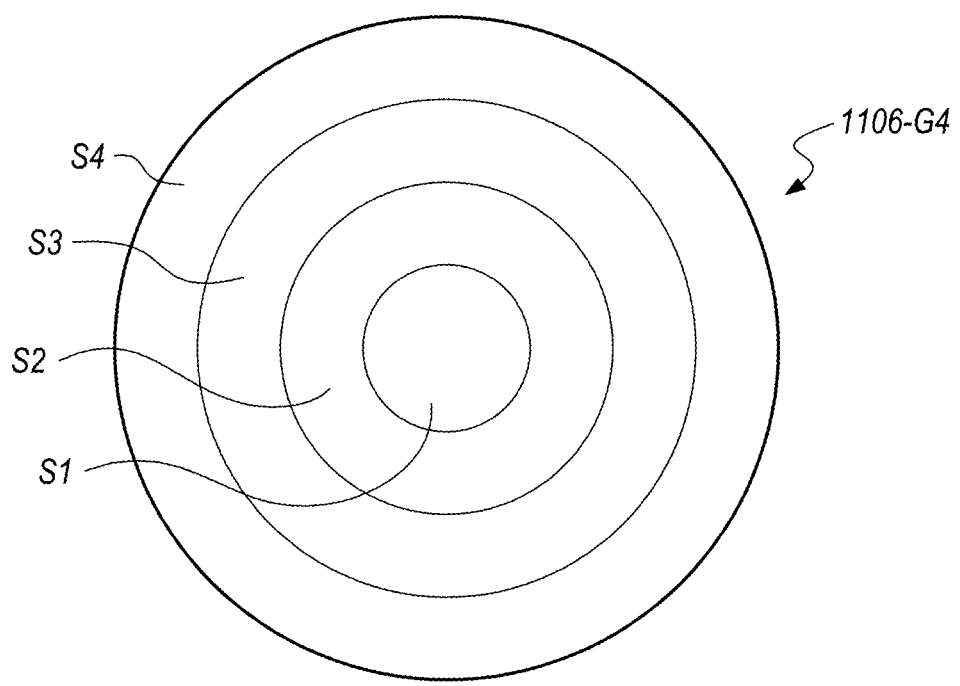

FIG. 18A illustrates an exemplary first electrode 1106-G1 of a controllable dimming system configured to polarize ambient light passing therethrough in a manner such that the controllable dimming assembly attenuates the ambient light in accordance with radial gradient dimming pattern G1 of FIG. 12A. The exemplary first electrode 1106-G1 has four sections/portions S1, S2, S3, S4 disposed and shaped similarly to the first electrode 1106A depicted in FIG. 17. FIG. 18B illustrates an exemplary first electrode 1106-G2 of a controllable dimming system configured to polarize ambient light passing therethrough in a manner such that the controllable dimming assembly attenuates the ambient light in accordance with radial gradient dimming pattern G2 of FIG. 12B. The exemplary first electrode 1106-G2 has four sections/portions S1, S2, S3, S4 like the first electrode 1106A depicted in FIG. 17, however the four sections/portions S1, S2, S3, S4 are shaped differently from the corresponding sections in the first electrode 1106A depicted in FIG. 17. FIG. 18C illustrates an exemplary first electrode 1106-G3 of a controllable dimming system configured to polarize ambient light passing therethrough in a manner such that the controllable dimming assembly attenuates the ambient light in accordance with linear gradient dimming pattern G3 of FIG. 12C. The exemplary first electrode 1106-G3 has four sections/portions S1, S2, S3, S4 like the first electrode 1106A depicted in FIG. 17, however the four sections/portions S1, S2, S3, S4 are shaped differently from the corresponding sections in the first electrode 1106A depicted in FIG. 17. FIG. 18D illustrates an exemplary first electrode 1106-G4 of a controllable dimming system configured to polarize ambient light passing therethrough in a manner such that the controllable dimming assembly attenuates the ambient light in accordance with radial gradient dimming pattern G4 of FIG. 12D. The exemplary first electrode 1106-G3 has four sections/portions S1, S2, S3, S4 like the first electrode 1106A depicted in FIG. 17, however the four sections/portions S1, S2, S3, S4 are shaped and disposed differently from the corresponding sections in the first electrode 1106A depicted in FIG. 17.

While the controllable dimming assemblies and various components thereof described above include specific numbers of sections/portions with specific shapes, these numbers and shapes are exemplary only. The numbers and shapes of the sections/portions can vary while remaining within the scope of this disclosure. While various mechanisms for controllably dimming are described above independently, the scope of this disclosure includes combining and sub-combining the above-described mechanisms. For instance, the polarizers depicted in FIGS. 13A to 13D can be combined with the electrodes depicted in FIGS. 14, 15 and 17A. The above-described controllable dimming assemblies allow the application of a few voltages (e.g., one or two) to execute a graded attenuation of light passing through the controllable dimming assemblies. This simple activation mechanism simplifies light attenuation for AR systems, which may activate light attenuation graded light attenuation in response to detected intensity and/or direction of exterior light.

As mentioned above with reference to FIG. 11, in some examples, a controllable dimming system may drive a dimming assembly in a manner so as to effect adjustments in the global level of opacity of a spatially-varying dimming pattern (e.g., gradient dimming pattern) over time based on any of a variety of different factors. In some implementations, such factors may include input received from one or more data sources. That is, in some implementations, a controllable dimming system may drive or otherwise adjust the amount of voltage that is applied to a dimming assembly based on input received from one or more data sources. Examples of such one or more data sources may include sensing devices, user interface components, display system components, network-accessible resources, and the like.

For instance, in some embodiments, a controllable dimming system may include one or more ambient light sensors (e.g., photodiodes, imaging sensors, etc.) configured to measure an intensity of ambient light incident thereon, and may adjust the amount of voltage that is applied to a dimming assembly based on data received from the one or more ambient light sensors in real-time. In some examples, a controllable dimming system may include one or more user interface components (e.g., handheld controller, buttons, dials, touchpads, microphones, cameras, and other components through which user input may be provided), and may adjust the amount of voltage that is applied to a dimming assembly based on data received from such one or more user interface components. In this way, the user may be able to interact with such one or more user interface components (e.g., by way of touch input, speech input, gesture input, etc.) to adjust a dimming assembly according to their preferences. In some embodiments, a controllable dimming system may adjust the amount of voltage that is applied to a dimming assembly based on data received from one or more display system components, such as one or more processing units configured to generate, render, and present virtual content. In some implementations, a controllable dimming system may adjust the amount of voltage that is applied to a dimming assembly based on data received from one or more resources over one or more communications networks, such as websites, cloud computing systems, remotely-located computing and/or sensing devices, and the like.

In some embodiments, a controllable dimming system may adjust the amount of voltage that is applied to a dimming assembly based on input received from a plurality of data sources including one or more sensing devices, one or more user interface components, one or more display system components, one or more network-accessible resources, or a combination thereof. Additional examples of such data sources and dimming assembly control schemes are described in further detail in U.S. Utility patent application Ser. No. 16/557,706, the entirety of which is incorporated herein by reference. In some implementations, one or more of the aforementioned data sources and/or dimming system control schemes may be employed in one or more of the systems and techniques described herein.

The above-described AR systems are provided as examples of various optical systems that can benefit from more selectively and controllably transmissive optical elements. Accordingly, use of the optical systems described herein is not limited to the disclosed AR systems, but rather applicable to any optical system. Indeed, although described primarily within the context of AR and VR display systems, it is to be understood that one or more of the systems and techniques described herein may also be leveraged in a variety of other paradigms and settings. For instance, in some implementations, one or more of the systems and techniques described herein may be employed in any of a variety of other types of eyewear, such as prescription eyeglasses, sunglasses, safety glasses, swimming goggles, and the like, as well as in any of a variety of other types of wearable gear that may include visors, face masks, and/or protective shields, such as helmets (e.g., football helmets, hockey helmets, motorcycle helmets, etc.), ski & snowboard goggles, paintball masks, and the like. For example, in some embodiments, two controllable dimming assemblies may be employed in one of the aforementioned types of eyewear and configured such that, when the eyewear is worn by a user, the two controllable dimming assemblies are positioned in front of/in alignment with the two eyes of the user, respectively, much like a pair of eyepieces. Furthermore, in other embodiments, a single, relatively wide controllable dimming assembly may be employed in one of the aforementioned types of wearable gear and configured such that, when the wearable gear is worn by the user, the controllable dimming assembly is positioned in front of both of the user's eyes in a manner similar to that of a visor, face mask, or shield. In these embodiments, the controllable dimming assembly may effectively serve as a visor, face mask, or shield of the wearable gear, or may be physically coupled to a visor, face mask, or shield of the wearable gear.

Additional examples of embodiments are provided below.

Example 1: A head-mounted device comprising: a frame configured to be worn about a head of a user of the head-mounted device; a controllable dimming assembly physically coupled to the frame in a manner so as to be positioned between an eye of the user and an environment of the user when the head-mounted device is worn by the user, wherein the controllable dimming assembly is configured to exhibit levels of opacity that vary from a first level of opacity to a second level of opacity as a function of location on the controllable dimming assembly; and control circuitry electrically coupled to the controllable dimming assembly, wherein the control circuitry is configured to apply one or more electrical signals to the controllable dimming assembly to adjust one or both of the first and second levels of opacity.

Example 2: The head-mounted device of Example 1, wherein the controllable dimming assembly is configured to exhibit (i) the first level of opacity at a first location on the controllable dimming assembly, and (ii) levels of opacity that vary as a function of distance from first location on the controllable dimming assembly.

Example 3: The head-mounted device of Example 2, wherein the controllable dimming assembly is configured to exhibit the second level of opacity at a second location on the controllable dimming assembly, the second location being different from the first location.

Example 4: The head-mounted device of Example 2, wherein the first location or the second location corresponds to a set of one or more points along at least a portion of an outer perimeter of the controllable dimming assembly.

Example 5: The head-mounted device of Example 2, wherein the first location corresponds to a location within an inner region of the controllable dimming assembly.

Example 6: The head-mounted device of Example 2, wherein the location within the inner region of the controllable dimming assembly corresponds to a center of the controllable dimming assembly.

Example 7: The head-mounted device of Example 1, wherein the first level of opacity represents a global minimum level of opacity and the second level of opacity represents a global maximum level of opacity.

Example 8: The head-mounted device of Example 1, wherein the controllable dimming assembly is configured to exhibit levels of opacity that vary linearly, exponentially, or logarithmically as a function of location on the controllable dimming assembly.

Example 9: The head-mounted device of Example 1, wherein the controllable dimming assembly is configured such that the first level of opacity and the second level of opacity vary based on a level of voltage of one or more electrical signals applied as input to the controllable dimming assembly.

Example 10: The head-mounted device of Example 9, wherein the controllable dimming assembly is configured such that the first level of opacity and the second level of opacity change at different rates as the level of voltage changes.

Example 11: The head-mounted device of Example 1, wherein the controllable dimming assembly comprises: first and second polarizers; first and second electrode assemblies disposed between the first and second polarizers; and a liquid crystal layer disposed between the first and second electrode assemblies.

Example 12: The head-mounted device of Example 11, wherein one or both of the first and second polarizers are configured to impart spatially-varying degrees of polarization to light passing therethrough.

Example 13: The head-mounted device of Example 11, wherein the control circuitry is electrically coupled to the first and second electrode assemblies and configured to apply one or more electrical signals to the controllable dimming assembly to produce an electric field between the first and second electrode assemblies.

Example 14: The head-mounted device of Example 13, wherein to produce the electric field between the first and second electrode assemblies, the controllable dimming assembly is configured to produce an electric field exhibiting spatially-varying levels of electric field strength between the first and second electrode assemblies.

Example 15: The head-mounted device of Example 13, wherein one or both of the first and second electrode assemblies are configured such that one or more properties thereof are spatially-varying.

Example 16: The head-mounted device of Example 15, wherein the one or more properties comprise a thickness, resistance, conductance, orientation, position, composition, or a combination thereof.

Example 17: The head-mounted device of Example 1, wherein the control circuitry comprises one or more of a voltage divider network, conductors, a processor, and a power supply.

Example 18: The head-mounted device of Example 1, wherein the controllable dimming assembly is physically coupled to the frame in a manner so as to be positioned between both eyes of the user and an environment of the user when the head-mounted device is worn by the user.

Example 19: The head-mounted device of Example 1, wherein the control circuitry is further configured to receive input from one or more data sources, and wherein to apply one or more electrical signals to the controllable dimming assembly to adjust one or both of the first and second levels of opacity, the control circuitry is configured to apply one or more electrical signals to the controllable dimming assembly to adjust one or both of the first and second levels of opacity based on input received from the one or more data sources.

Example 20: The head-mounted device of Example 19, wherein the one or more data sources comprise one or more sensing devices, user interface components, display system components, network-accessible resources, or a combination thereof.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. An augmented reality system, comprising:
a light source to generate a virtual light beam, the virtual light beam carrying information for a virtual object;
a light guiding optical element, the light guiding optical element allowing a first portion of a first real-world light beam to pass therethrough, wherein the virtual light beam enters the light guiding optical element, propagates through the light guiding optical element by substantially total internal reflection (TIR), and exits the light guiding optical element; and a lens disposed adjacent and exterior to a surface of the light guiding optical element, the lens comprising a light modulating mechanism to attenuate a second portion of the real-world light beam and to allow the first portion of the real-world light to pass through the lens, the light modulating mechanism comprising:

a liquid crystal layer;

first and second electrodes disposed adjacent to and on opposite sides of the liquid crystal layer;

first and second compensation films disposed adjacent and exterior to the first and second electrodes, respectively; and first and second polarizers disposed adjacent and exterior to the first and second compensation films, respectively.

2. The system of claim 1, wherein the first and second polarizer each includes a plurality of regions configured to impart different degrees of polarization on light passing therethrough.

3. The system of claim 2, wherein the liquid crystal layer is configured to impart a degree of retardation or polarization rotation on light passing therethrough in response to a voltage applied by the first and second electrodes.

4. The system of claim 3, wherein the degree of polarization imparted by the liquid crystal layer is proportional to the voltage applied by the first and second electrodes.

5. The system of claim 1, wherein the first and second electrodes are configured to apply a voltage to the liquid crystal layer that varies along a direction in the liquid crystal layer.

6. The system of claim 5, wherein the direction is from a bottom of the liquid crystal layer to a top of the liquid crystal layer.

7. The system of claim 5, wherein the first and second electrodes are separated by a distance that increases along the direction in the liquid crystal layer.

8. The system of claim 7, wherein the first electrode tapers away from the second electrode such that the distance increases along the direction in the liquid crystal layer.

9. The system of claim 7, wherein the first electrode comprises a plurality of segments, each adjacent pair of segments having a preceding segment disposed farther from the second electrode compared to a following segment in the direction.

10. The system of claim 5, wherein the first electrode has a thickness that decreases along the direction.

11. The system of claim 5, wherein the first electrode comprises first, second, and third segments disposed along the direction, and wherein the first and third segments have a first and a third resistance that is lower than a second resistance of the second segment.

12. The system of claim 11, wherein the first and third segments comprise indium tin oxide.

13. The system of claim 11, wherein the second segment comprises graphene.

14. The system of claim 11, further comprising first and second voltage sources electrically coupled to the first and third segments of the first electrode.

15. The system of claim 1, wherein the first electrode comprises a plurality of segments disposed along the direction and electrically separated from each other by a corresponding plurality of resistors.

16. The system of claim 15, further comprising a voltage source electrically coupled to a first segment of the plurality of segments at a far end of the first electrode along the direction.

17. The system of claim 15, wherein the first electrode has a flatten shape, and wherein the plurality of resistors are disposed along an edge of the first electrode.

18. The system of claim 17, wherein the plurality of segments are physically separated from each other by a plurality of electrically-insulating members.

19. The system of claim 15, wherein each of the plurality of resistors are disposed physically between respective pairs of the plurality of segments.

* * * * *